United States Patent
Fu et al.

(10) Patent No.: US 12,457,084 B2
(45) Date of Patent: Oct. 28, 2025

(54) METHOD AND APPARATUS FOR TRANSMITTING UPLINK SIGNAL IN A COMMUNICATION SYSTEM

(71) Applicant: Samsung Electronics Co., Ltd., Suwon-si (KR)

(72) Inventors: Jingxing Fu, Beijing (CN); Feifei Sun, Beijing (CN); Yi Wang, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 17/624,717

(22) PCT Filed: Jul. 10, 2020

(86) PCT No.: PCT/KR2020/009082
§ 371 (c)(1),
(2) Date: Jan. 4, 2022

(87) PCT Pub. No.: WO2021/010666
PCT Pub. Date: Jan. 21, 2021

(65) Prior Publication Data
US 2022/0247543 A1    Aug. 4, 2022

(30) Foreign Application Priority Data

Jul. 12, 2019 (CN) .......................... 201910630689.9
Sep. 30, 2019 (CN) .......................... 201910938786.4
(Continued)

(51) Int. Cl.
*H04W 74/0808* (2024.01)
*H04L 5/00* (2006.01)

(52) U.S. Cl.
CPC ....... *H04L 5/0055* (2013.01); *H04W 74/0808* (2013.01)

(58) Field of Classification Search
CPC .......................... H04L 5/0055; H04W 74/0808
See application file for complete search history.

(56) References Cited

U.S. PATENT DOCUMENTS 10,425,839 B2    9/2019    Yang et al.
10,461,895 B2   10/2019    Rosa et al.
(Continued)

FOREIGN PATENT DOCUMENTS

CN    104811283 A    7/2015
CN    105992345 A    10/2016
(Continued)

OTHER PUBLICATIONS

Vivo, "Discussion on the enhancements to configured grants", R1-1906133, 3GPP TSG RAN WG1 #97, Reno, USA, sections 2.1-2.4, May 1, 2019.
(Continued)

*Primary Examiner* — Siren Wei
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present application provides a method for transmitting hybrid automatic retransmission request response (HARQ-ACK) comprising: determining a PUCCH resource occupied by transmitting the HARQ-ACK, according to a PRI of the HARQ-ACK in a PDCCH scheduling a PDSCH and an LBT sub-band where a PDCCH resource is located; performing the HARQ-ACK transmission on the
(Continued)

PUCCH resource occupied by transmitting the HARQ-ACK according to the PUCCH resource occupied by transmitting the HARQ-ACK.

15 Claims, 24 Drawing Sheets

(30) Foreign Application Priority Data

Oct. 31, 2019 (CN) .......................... 201911055423.2
Mar. 20, 2020 (CN) .......................... 202010203399.9

(56) References Cited

U.S. PATENT DOCUMENTS

| | | | |
|---|---|---|---|
| 10,805,950 | B2 | 10/2020 | Noh et al. |
| 11,139,925 | B2 | 10/2021 | Karaki et al. |
| 11,606,776 | B2 | 3/2023 | Zhu et al. |
| 2016/0337086 | A1 | 11/2016 | Shen et al. |
| 2017/0207895 | A1* | 7/2017 | Yang ............... H04W 72/23 |
| 2018/0367282 | A1 | 12/2018 | Li et al. |
| 2019/0059057 | A1 | 2/2019 | Peng et al. |
| 2019/0253200 | A1* | 8/2019 | Salem ............. H04W 74/0808 |

FOREIGN PATENT DOCUMENTS

| | | |
|---|---|---|
| CN | 107743695 A | 2/2018 |
| CN | 109155720 A | 1/2019 |
| CN | 109275191 A | 1/2019 |
| KR | 10-2019-0067891 A | 6/2019 |

OTHER PUBLICATIONS

Huawei, "Feature lead summary of HARQ enhancements for NR-U", R1-1907652, 3GPP TSG RAN WG1 Meeting #97, Reno, USA, sections 2.1, 2.1.5, 2.2.1, May 16, 2019.
Chinese Office Action dated Jan. 27, 2025, issued in Chinese Patent Application No. 201911055423.2.
5G; NR; Physical layer procedures for control, 3GPP TS 38.213 version 15.5.0 Release 15, May 31, 2019.
Chinese Office Action dated Jun. 26, 2025, issued in Chinese Patent Application No. 201911055423.2.
Chinese Rejection Decision dated Aug. 28, 2025, issued in Chinese Patent Application No. 201911055423.2.

* cited by examiner

METHOD AND APPARATUS FOR TRANSMITTING UPLINK SIGNAL IN A COMMUNICATION SYSTEM

TECHNICAL FIELD

The present application relates to the field of wireless communication technologies, and in particular, to a method for transmitting HARQ-ACK and user equipment, and to an UCI transmission method, an LBT execution method, a device, a terminal equipment and a computer-readable storage medium.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In the NR system, the UE configures a Physical Uplink Control Channel (PUCCH) resource set for transmitting Uplink Control Information (UCI) on the active BWP. PUCCH resource indicator information (PRI) for scheduling Hybrid Automatic Repeat Request-Acknowledgement (HARQ-ACK) in the Physical Downlink Shared Channel (PDSCH) indicates a resource in the resource set to be used to transmit the HARQ-ACK. In the unlicensed frequency band, LBT is performed before transmitting the PUCCH. Only when the LBT result is idle, transmission is allowed. Otherwise, transmission is not allowed. In order to increase the opportunity of the HARQ-ACK transmission, the base station can instruct the UE, by PRI, to use the multiple PUCCH resources on sub-bands of different LBTs in the frequency domain to transmit HARQ-ACK, and multiple PUCCH resources on sub-bands of different LBTs are used as LBT, so that the chance that LBT performed on the PUCCH resources is idle increases. Then, in this system, how to indicate multiple PUCCH resources in the frequency domain by PRI to transmit HARQ-ACK is a problem to be solved.

In the NR system, the UE is configured with resources for transmitting Sounding Reference Signal (SRS) on the activated BWP. In the unauthorized frequency band, Listen Before Talk is required before SRS transmission. SRS can be transmitted only when LBT result is idle, otherwise transmission is not allowed. How to determine the frequency domain bandwidth of LBT for SRS transmission is a problem to be solved.

In addition, for the transmission of Uplink Control Information (UCI), UCI can be transmitted in a physical uplink control channel (PUCCH) or a physical uplink shared channel (PUSCH). When transmitting UCI in the PUSCH, the UCI uses PUSCH Demodulation Reference Signal (DMRS) to be demodulated, that is, the DMRS used to demodulate UCI and DMRS used to demodulate data transmitted in PUSCH are multiplexed with the same DMRS, but this method will probably cause the demodulation performance of UCI not to be guaranteed or affect the performance of PUSCH.

Solution to Problem

In view of the shortcomings of the existing methods, the application proposes a method and for transmitting HARQ-ACK and an user equipment to solve the problem of how to implement the HARQ-ACK transmission in an unlicensed band.

In a first aspect, a method for transmitting HARQ-ACK is provided, applied to UE, comprising determining a Physical Uplink Control Channel (PUCCH) resource occupied by transmitting the HARQ-ACK, according to a PUCCH resource indicator information (PRI) of the HARQ-ACK in a Physical Downlink Control Channel (PDCCH) scheduling a Physical Downlink Shared Channel (PDSCH) and a Listen Before Talk (LBT) sub-band where a PDCCH resource is located;

performing the HARQ-ACK transmission on the PUCCH resource occupied by transmitting the HARQ-ACK according to the PUCCH resource occupied by transmitting the HARQ-ACK.

In a second aspect, a method for transmitting HARQ-ACK is provided, applied to UE, comprising:

determining an LBT sub-band where a PUSCH resource is located according to the PUSCH resource scheduled by a base station;

determining the LBT sub-band where a PUCCH resource is located according to the PUCCH resource indicated by the base station;

selecting at least one resource from the PUCCH resource indicated by the base station and the PUSCH resource scheduled by the base station;

performing LBT on the LBT sub-band where the selected resource is located to determine LBT result information;

performing the HARQ-ACK transmission on the PUCCH resource or the PUSCH resource according to the LBT result information.

In a third aspect, a UE is provided, comprising:

a first processing module, configured to determine a PUCCH resource occupied by transmitting the HARQ-ACK, according to a PRI of the HARQ-ACK in a PDCCH scheduling a PDSCH and an LBT sub-band where a PDCCH resource is located;

a second processing module, configured to perform the HARQ-ACK transmission on the PUCCH resource occupied by transmitting the HARQ-ACK according to the PUCCH resource occupied by transmitting the HARQ-ACK.

In a fourth aspect, a UE is provided, comprising:

a third processing module, configured to determine an LBT sub-band where a PUSCH resource is located according to the PUSCH resource scheduled by a base station;

a fourth processing module, configured to determine the LBT sub-band where a PUCCH resource is located according to the PUCCH resource indicated by the base station;

a fifth processing module, configured to select at least one resource from the PUCCH resource indicated by the base station and the PUSCH resource scheduled by the base station;

a sixth processing module, configured to perform LBT on the LBT sub-band where the selected resource is located to determine LBT result information;

a seventh processing module, configured to perform the HARQ-ACK transmission on the PUCCH resource or the PUSCH resource according to the LBT result information.

In a fifth aspect, a UE is provided, comprising: a processor and a memory;

the memory is configured to store machine-readable instructions, and when executed by the processor, cause the processor to execute the method for transmitting HARQ-ACK in the first aspect.

In a sixth aspect, a UE is provided, comprising: a processor and memory;

the memory is configured to store machine-readable instructions, and when executed by the processor, cause the processor to execute the method for transmitting HARQ-ACK in the second aspect.

The technical solutions provided in the embodiments of the present application have at least the following beneficial effects:

determining a PUCCH resource occupied by transmitting the HARQ-ACK, according to a PRI of the HARQ-ACK in a PDCCH scheduling a PDSCH and an LBT sub-band where a PDCCH resource is located; performing the HARQ-ACK transmission on the PUCCH resource occupied by transmitting the HARQ-ACK according to the PUCCH resource occupied by transmitting the HARQ-ACK. In this way, the application realizes that in the unlicensed frequency band, the LBT sub-band where the PDCCH is located and the PRI jointly determine the PUCCH resource occupied by transmitting the HARQ-ACK, which can save the number of bits required by the PRI, while ensuring the flexibility of resource indicator.

Additional aspects and advantages of the present application will be given in the following description, which will become apparent from the following description or be learned through the practice of the present application.

Advantageous Effects of Invention

The embodiments of the present application have at least the following beneficial effects: Achieve HARQ-ACK transmission in unlicensed frequency band.

The technical scheme provided by the disclosure has additional beneficial effects that: the LBT execution method, device, terminal equipment and computer-readable storage medium provided by the embodiment of the disclosure solve the problem of how to realize SRS transmission in an unauthorized frequency band. Based on the solution, frequency domain resources for transmitting SRS before SRS transmission in an unauthorized frequency band can be determined, that is, in order to transmit the uplink LBT sub-band of SRS, LBT can be further performed on the determined frequency domain resources to perform SRS transmission based on the determined LBT result of the uplink LBT sub-band.

BRIEF DESCRIPTION OF DRAWINGS

In order to explain the technical solutions in the embodiments of the present application more clearly, the drawings used in the description of the embodiments of the present application will be briefly introduced below.

MODE FOR THE INVENTION

Figure 1:
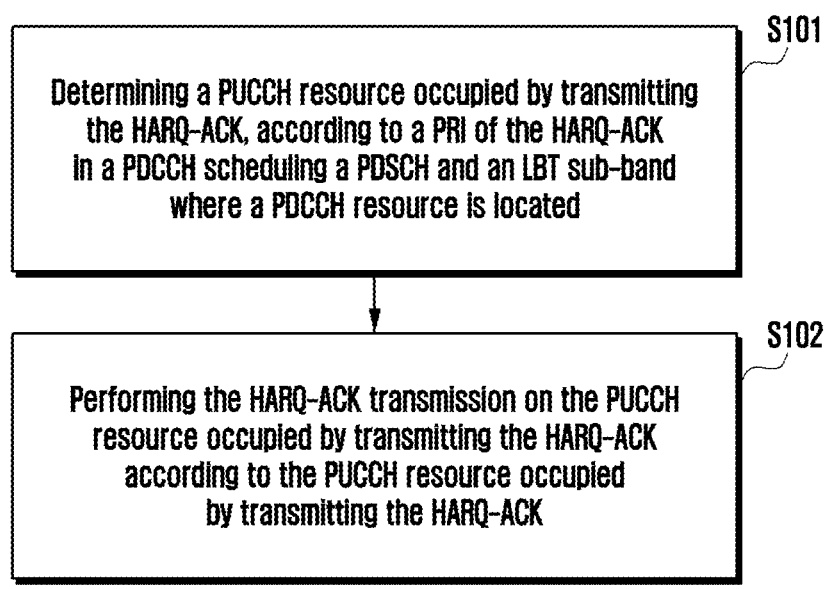
FIG. 1 is a schematic flowchart of a method for transmitting HARQ-ACK according to an embodiment of the present application.

In the New Radio (NR) air interface system, the bandwidth of the carrier is relatively large. Some User Equipments (UEs) have limited bandwidth capabilities, and the control information and data can only be transmitted or received within a portion of the frequency domain bandwidth of the carrier, while other UEs have relatively strong bandwidth capabilities, and the control information and data can be transmitted or received within the full bandwidth of the frequency domain of the carrier. The bandwidth capability of the UE mentioned here refers to the maximum bandwidth that the UE can receive or transmit data in the frequency domain at the same time. For example, some UEs have a bandwidth capability of 20 MHz, and some UEs have a bandwidth capability of 5 MHz. For UE with poor bandwidth capability, in order to improve the frequency diversity performance of users, users may work in restricted frequency bands with good performance at different times. We call a restricted frequency band as the Bandwidth Part (BWP), that is, the UE may receive and transmit the control information and data in different BWPs at different times.

As the contradiction between users' demands for broadband wireless services and the scarcity of spectrum resources becomes increasingly acute, mobile operators have considered unauthorized band (also known as unlicensed band) as supplements to licensed bands. The 3rd Generation Partnership Project (3GPP) has determined a solution for effective carrier aggregation through unlicensed band and licensed band. Under the premise of ensuring that there is no obvious impact on other technologies in the unlicensed frequency band, effectively improve the utilization rate of the entire network spectrum.

Unlicensed frequency band has generally been allocated for some other purpose, such as radar or 802.11 series wireless fidelity (WiFi). In this way, the interference level in the unlicensed frequency band is uncertain, which makes it difficult to guarantee the quality of service (QoS) of LTE transmission. However, the unlicensed frequency band can still be used for data transmission with low QoS requirements. Here, a long term evolution (LTE) system of a secondary cell deployed on an unlicensed frequency band is referred to as a Licensed Assisted Access (LAA) system. In the unlicensed band, how to avoid mutual interference between the LAA system and other wireless systems such as radar or WiFi is a key issue. Carrier Sense (CCA) is a collision avoidance mechanism commonly used on the unlicensed band. A mobile station (STA) must detect the wireless channel before transmitting signals, and can only occupy the wireless channel to transmit signals when it detects that the wireless channel is idle. LAA also follows a similar mechanism to ensure less interference with other signals. The LAA device (such as a base station or a user terminal) dynamically switches on or off based on the results of carrier sense, that is, it transmits when it detects that the channel is idle, and does not transmit if the channel is busy.

In the NR system, the UE configures a Physical Uplink Control Channel (PUCCH) resource set for transmitting Uplink Control Information (UCI) on the active BWP. PUCCH resource indicator information (PRI) for scheduling Hybrid Automatic Repeat Request-Acknowledgement (HARQ-ACK) in the Physical Downlink Shared Channel (PDSCH) indicates a resource in the resource set to be used to transmit the HARQ-ACK. In the unlicensed frequency band, LBT is performed before transmitting the PUCCH. Only when the LBT result is idle, transmission is allowed. Otherwise, transmission is not allowed. In order to increase the opportunity of the HARQ-ACK transmission, the base station can instruct the UE, by PRI, to use the multiple PUCCH resources on sub-bands of different LBTs in the frequency domain to transmit HARQ-ACK, and multiple PUCCH resources on sub-bands of different LBTs are used as LBT, so that the chance that LBT performed on the PUCCH resources is idle increases. Then, in this system, how to indicate multiple PUCCH resources in the frequency domain by PRI to transmit HARQ-ACK is a problem to be solved.

In the NR system, the UE is configured with resources for transmitting Sounding Reference Signal (SRS) on the activated BWP. In the unauthorized frequency band, Listen Before Talk is required before SRS transmission. SRS can be transmitted only when LBT result is idle, otherwise transmission is not allowed. How to determine the frequency domain bandwidth of LBT for SRS transmission is a problem to be solved.

In addition, for the transmission of Uplink Control Information (UCI), UCI can be transmitted in a physical uplink control channel (PUCCH) or a physical uplink shared channel (PUSCH). When transmitting UCI in the PUSCH, the UCI uses PUSCH Demodulation Reference Signal (DMRS) to be demodulated, that is, the DMRS used to demodulate UCI and DMRS used to demodulate data transmitted in PUSCH are multiplexed with the same DMRS, but this method will probably cause the demodulation performance of UCI not to be guaranteed or affect the performance of PUSCH.

Hereinafter, embodiments of the present application are described in detail. Examples of the embodiments are shown in the accompanying drawings, wherein the same or similar reference numerals represent the same or similar elements or elements having the same or similar functions throughout. The embodiments described below with reference to the drawings are exemplary and are only used to explain the present application, and cannot be construed as limiting the present invention.

Those skilled in the art should understand that the singular forms "a", "an", "said" and "the" include plural referents unless the context clearly dictates otherwise. It should be further understood that the expression "comprising" or "include" used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

To make the objectives, technical solutions, and advantages of the present application clearer, the embodiments of the present application will be described in further detail below with reference to the accompanying drawings.

Embodiment 1

An embodiment of the present application provides a method for transmitting HARQ-ACK, which is applied to a UE. A schematic flowchart of the method is shown in FIG. 1, the method comprising:

Step S101: determining a Physical Uplink Control Channel (PUCCH) resource occupied by transmitting the HARQ-ACK, according to a PUCCH resource indicator information PRI of the HARQ-ACK in a Physical Downlink Control Channel (PDCCH) scheduling a Physical Downlink Shared Channel (PDSCH) and a Listen Before Talk (LBT) sub-band where a PDCCH resource is located.

Step S102: performing the HARQ-ACK transmission on the PUCCH resource occupied by transmitting the HARQ-ACK according to the PUCCH resource occupied by transmitting the HARQ-ACK.

In the embodiment of the present application, determining a PUCCH resource occupied by transmitting the HARQ-ACK, according to a PRI of the HARQ-ACK in a PDCCH scheduling a PDSCH and an LBT sub-band where a PDCCH resource is located; performing the HARQ-ACK transmission on the PUCCH resource occupied by transmitting the HARQ-ACK according to the PUCCH resource occupied by transmitting the HARQ-ACK. In this way, the application realizes that in the unlicensed frequency band, the LBT sub-band where the PDCCH is located and the PRI jointly determine the PUCCH resource occupied by transmitting the HARQ-ACK, which can save the number of bits required by the PRI, while ensuring the flexibility of resource indicator.

Optionally, before performing the HARQ-ACK transmission on the PUCCH resource occupied by transmitting the HARQ-ACK, further comprising:

performing LBT on each PUCCH resource occupied by transmitting the HARQ-ACK indicated by the PRI of the HARQ-ACK in turn, according to the PRI of the HARQ-ACK and the LBT sub-band where the PDCCH resource is located, according to a predefined priority policy.

Optionally, the predefined priority policy comprising:

compared with downlink LBT sub-band where the PDCCH resource including the PRI of the HARQ-ACK is located, the LBT is perform preferentially on the PUCCH resource in an uplink LBT sub-band that is in a same frequency band as the downlink LBT sub-band, wherein the same frequency band is in an unlicensed band.

Optionally, the determining PUCCH resource occupied by transmitting the HARQ-ACK according to the PRI of the HARQ-ACK in the PDCCH and the LBT sub-band where the PDCCH is located, comprising:

determining a PUCCH resource subset according to the PRI of the HARQ-ACK in the PDCCH and a downlink LBT sub-band where the PDCCH resource is located, wherein the PUCCH resource subset comprises one or more PUCCH resources occupied by transmitting the HARQ-ACK.

Optionally, receiving system information, wherein the system information includes a master information block or a system information block;

determining a PUCCH resource set, according to the system information, to indicate one PUCCH resource occupied by transmitting the HARQ-ACK in the PUCCH resource set according to the PRI of the HARQ-ACK in a Downlink Control Information (DCI) in the PDCCH scheduling the PDSCH.

Optionally, the LBT sub-band in step S101 is that the UE is configured with at least one sub-band, and the base station performs LBT in each sub-band, and each sub-band is called an LBT sub-band.

Optionally, in a case where the UE is configured with at least one downlink LBT sub-band, and the UE is also configured with at least one uplink LBT sub-band, a method for indicating resources.

Optionally, the method for determining the PUCCH resource for the UE to transmit HARQ-ACK is divided into two steps: first, the UE obtains a PUCCH resource set by receiving a high-layer signaling configuration, for example, the PUCCH set is {s0, s1, s2, s3, . . . , s7}, and then instructs to use one PUCCH resource in the set to transmit the HARQ-ACK information by a field (refers as PUCCH Resource Indicator (PRI)) in the DCI of the PDCCH scheduling the PDSCH. The specific indication method is shown in Table 1.

TABLE 1

| PRI value | PUCCH resource |
| --- | --- |
| 000 | s0 |
| 001 | s1 |
| 010 | s2 |
| 011 | s3 |
| 100 | s4 |
| 101 | s5 |
| 110 | s6 |
| 111 | s7 |

Table 1: Mapping between PUCCH resource indicator and PUCCH resource

Optionally, the PUCCH resource indicator for transmitting HARQ-ACK in an unlicensed band has the following methods.

Figure 2:
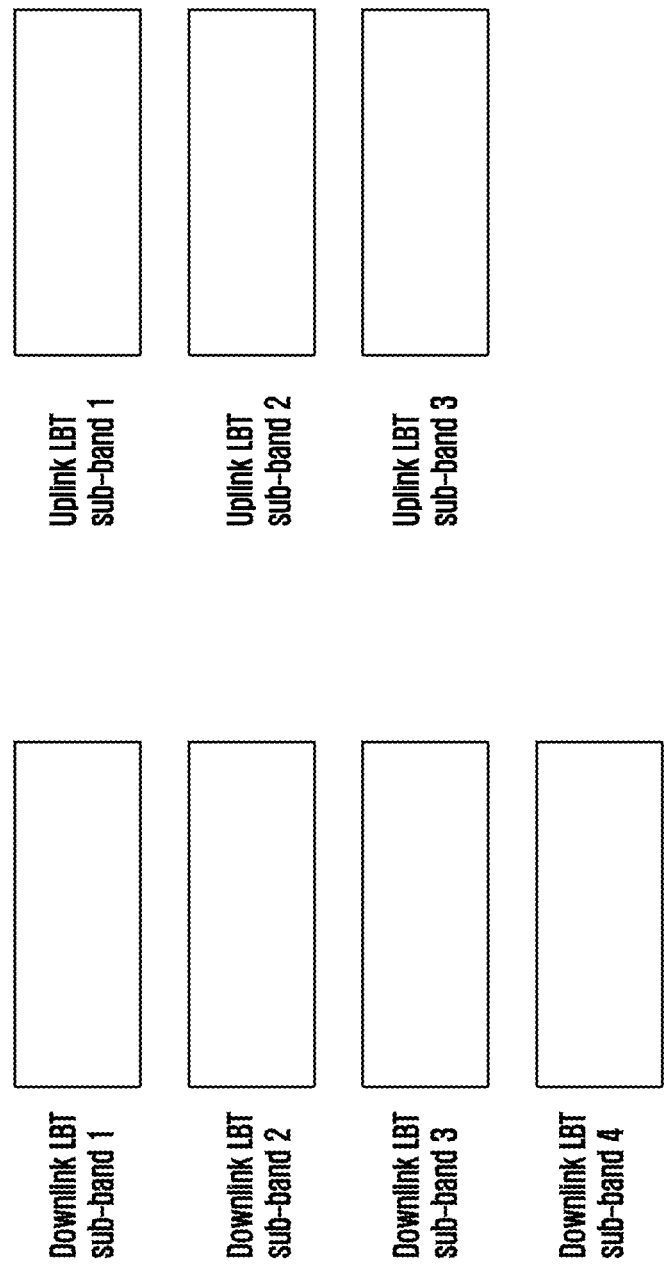
FIG. 2 is a schematic diagram in which a base station configures a downlink LBT sub-band and an uplink LBT sub-band to a UE by using high-layer signaling according to an embodiment of the present application.

Method 1:

For using the PUCCH to transmit HARQ-ACK in unlicensed band, since the UE needs to perform LBT before transmitting HARQ-ACK, HARQ-ACK can be transmitted only when the LBT result is idle, otherwise HARQ-ACK cannot be transmitted. In order to avoid the occurrence of the case where HARQ-ACK cannot be transmitted since the LBT result is idle, the base station indicates to the UE at least one PUCCH resource in the frequency domain location for transmitting HARQ-ACK. Each PUCCH resource is located in a different uplink LBT sub-band, and LBT is performed separately on each PUCCH resource. LBT can be performed on each indicated PUCCH resource in turn according to a certain priority order, LBT can also be performed on each indicated PUCCH resource at the same time. For example, the base station uses the high-layer signaling to configure the UE with four downlink LBT sub-bands and three uplink LBT sub-bands, as shown in FIG. 2. In each downlink LBT sub-band, a Control Resource Set can be configured through high-layer signaling to transmit PDCCH. In each uplink LBT sub-band, PUCCH resources can be configured through high-layer signaling to transmit HARQ-ACK. The PUCCH resources configured by multiple uplink LBT sub-bands constitute a PUCCH resource set. For example, the base station uses the high-layer signaling to configure the UE with three uplink LBT sub-bands, the three uplink LBT sub-bands are: uplink LBT sub-band 1, uplink LBT sub-band 2 and uplink LBT sub-band 3. The three uplink sub-bands may belong to one BWP of a serving cell, or may belong to multiple serving cells. In uplink LBT sub-band 1, the base station uses the high-layer signaling to configure the UE with four PUCCH resources: {PUCCH-0, PUCCH-1, PUCCH-2, PUCCH-3}; in uplink LBT sub-band 2, the base station uses the high-layer signaling to configure the UE with four PUCCH resources {PUCCH-4, PUCCH-5, PUCCH-6, PUCCH-7}; in uplink LBT sub-band 3, the base station uses the high-layer signaling to configure the UE with four PUCCH resources {PUCCH-8, PUCCH-9, PUCCH-10, PUCCH-11}, and the PUCCH resources configured in the three uplink LBT sub-bands constitute a PUCCH resource set: {PUCCH-0, PUCCH-1, PUCCH-2, PUCCH-3, PUCCH-4, PUCCH-5, PUCCH-6, PUCCH-7, PUCCH-8, PUCCH-9, PUCCH-10, PUCCH-11}, which is called PUCCH-set. The PRI in each PDCCH may indicate one or more PUCCH resources in one or more uplink LBT sub-bands, that is, a subset of the PUCCH-set, and multiple PUCCH resources in a subset belong to different uplink LBT sub-bands. For example, PUCCH resources included in PUCCH resource subset 1 are: {PUCCH-0, PUCCH-4}, PUCCH-0 belongs to uplink LBT sub-band 1, and PUCCH-4 belongs to uplink LBT sub-band 2. After receiving the high-layer signaling and knowing the PUCCH resource subset, the UE performs LBT on the uplink LBT sub-bands where all PUCCH resources in the PUCCH resource subset are located respectively, and then selects one PUCCH resource, among the PUCCH resources, whose LBT result is idle to transmit HARQ-ACK, or HARQ-ACK is transmitted on those PUCCH resources whose LBT result is idle. For example, the PUCCH-set is divided into eight subsets, and the number of PUCCH resources and which PUCCH resources are contained in each subset can be determined by UE through receiving a high-layer signaling configuration. Then, each PUCCH resource subset is indicated by a PRI of 3 bits. The mapping between the PRI indicator value and the PUCCH resource subset is shown in Table 2. The mapping between the PRI and the PUCCH resource subset is independent of the downlink LBT sub-band where the PDCCH is received.

TABLE 2

| PRI value | PUCCH resource subset |
| --- | --- |
| 000 | PUCCH resource subset 1 configured by high-layer signaling |
| 001 | PUCCH resource subset 2 configured by high-layer signaling |
| 010 | PUCCH resource subset 3 configured by high-layer signaling |
| 011 | PUCCH resource subset 4 configured by high-layer signaling |
| 100 | PUCCH resource subset 5 configured by high-layer signaling |
| 101 | PUCCH resource subset 6 configured by high-layer signaling |
| 110 | PUCCH resource subset 7 configured by high-layer signaling |
| 111 | PUCCH resource subset 8 configured by high-layer signaling |

Table 2: Mapping between PUCCH resource indicator and PUCCH resource subsets

LBT is performed on each PUCCH resource indicated by the PRI in turn according to a certain priority order. The priority can be determined according to explicit signaling or implicit signaling. For example, the method for determining the priority order of performing LBT on each indicated PUCCH resource in turn according to implicit signaling is: LBT is preferentially performed on the PUCCH resources in the uplink LBT sub-band which are in the same frequency band as the downlink LBT sub-band where the PDCCH containing the PRI is located. For example, the downlink LBT sub-band 1 and the uplink LBT sub-band 1 are in the same frequency band, and the downlink LBT sub-band 1 and the uplink LBT sub-band 2 are not in the same frequency band. The PRI contained in the PDCCH in the downlink LBT sub-band 1 indicates two PUCCH resources, which are PUCCH-1 and PUCCH-2, wherein PUCCH-1 is located in the uplink LBT sub-band 1, and PUCCH-2 is located in the uplink LBT sub-band 2. The UE preferentially performs LBT on the uplink LBT sub-band 1 containing PUCCH-1, and then performs LBT on the uplink LBT sub-band 2 containing PUCCH-2. Because the PDCCH is transmitted in the downlink LBT sub-band 1, the LBT result of the downlink LBT sub-band 1 is idle, and LBT is performed preferentially in the uplink LBT sub-band 1 in the same frequency band as the downlink LBT sub-band 1, the probability of the LBT result being idle is larger.

Figure 3:
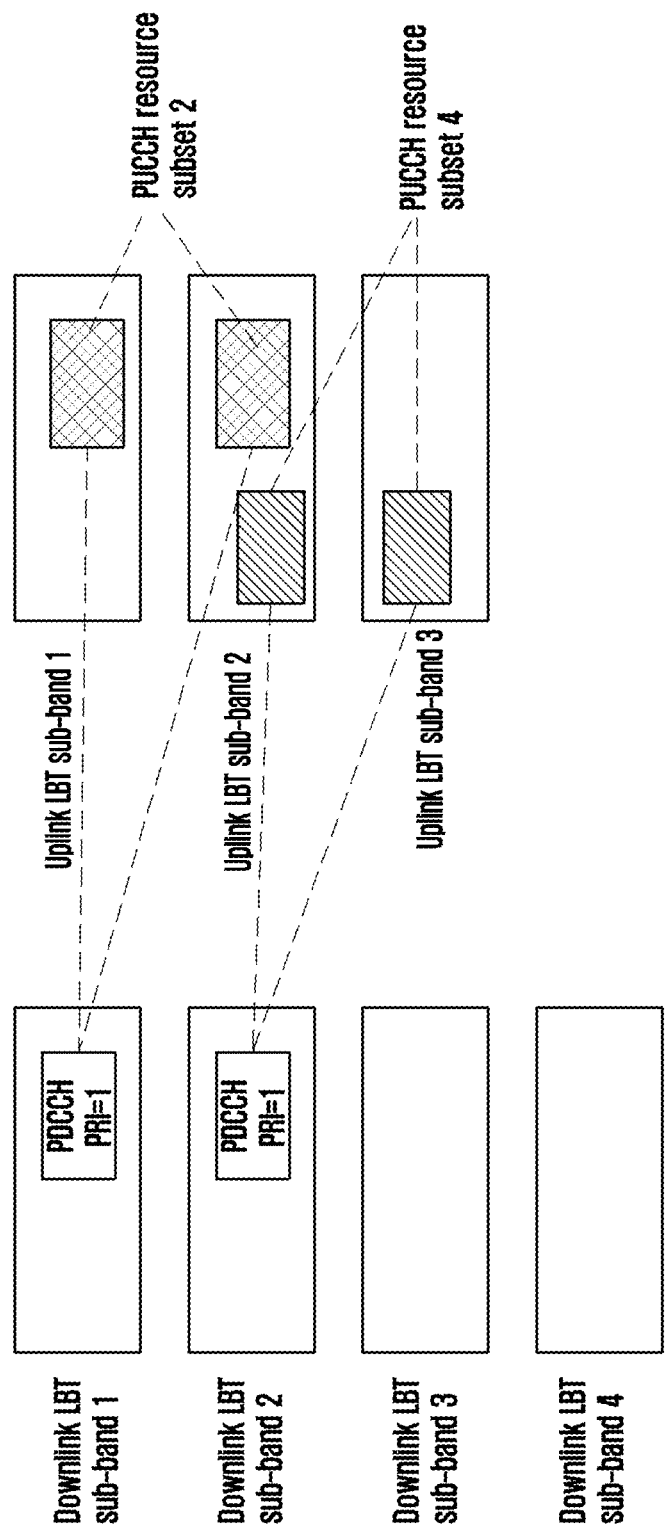
FIG. 3 is a schematic diagram of PUCCH resource subsets indicated by same PRI in PDCCHs in different downlink LBT sub-bands according to an embodiment of the present application.

Method 2:

Another PUCCH resource indicator method is: the PUCCH resource subset is jointly determined by the PRI and the downlink LBT sub-band where the PDCCH containing the PRI is located. For example, the base station configures the UE with three uplink LBT sub-bands, which are: uplink LBT sub-band 1, uplink LBT sub-band 2, and uplink LBT sub-band 3. These three uplink sub-bands may belong to one BWP of a serving cell, or may belong to multiple serving cells. The base station configures the UE with four downlink LBT sub-bands, which are: downlink LBT sub-band 1, downlink LBT sub-band 2, downlink LBT sub-band 3, and downlink LBT sub-band 4. In the uplink LBT sub-band 1, the base station configures the UE with four PUCCH resources: {PUCCH-0, PUCCH-1, PUCCH-2, PUCCH-3}; in the uplink LBT sub-band 2, the base station configures the UE with four PUCCH resource: {PUCCH-4, PUCCH-5, PUCCH-6, PUCCH-7}; in the uplink LBT sub-band 3, the base station configures the UE with four PUCCH resources: {PUCCH-8, PUCCH-9, PUCCH-10, PUCCH-11}, the PUCCH resources configured in the three uplink LBT sub-bands constitute a PUCCH resource set: {PUCCH-0, PUCCH-1, PUCCH-2, PUCCH-3, PUCCH-4, PUCCH-5, PUCCH-6, PUCCH-7, PUCCH-8, PUCCH-9, PUCCH-10, PUCCH-11}, which is called PUCCH-set. The PRI in each PDCCH and the downlink LBT sub-band where the PDCCH is located may indicate one or more PUCCH resources in one or more uplink LBT sub-bands, that is, a subset of the PUCCH-set. For example, the PUCCH-set is divided into eight subsets, the number of PUCCH resources and which PUCCH resources are contained in each subset can be determined by UE through receiving a high-layer signaling configuration. Then, a PRI of 2 bits is used to indicate each PUCCH resource subset and the downlink LBT sub-band where the PDCCH is located. The mapping between the PRI indicator value and the PUCCH resource subset is shown in Table 3. The PUCCH resource subsets indicated by the same PRI in the PDCCH in different downlink LBT sub-bands may be different, as shown in FIG. 3. PRI=01 in the PDCCH in the downlink LBT sub-band 1 indicates the PUCCH resource subset 2 configured by high-layer signaling. PRI=01 in the PDCCH in the downlink LBT sub-band 2 indicates the PUCCH resource subset 4 configured by high-layer signaling.

The process for the UE to obtain a PUCCH resource subset is: the UE first obtains the downlink LBT sub-band configured by the UE, the uplink LBT sub-band configured by the UE, the PUCCH resource of each uplink LBT sub-band, and the PUCCH resource subset corresponding to the PRI value in the PDCCH of each downlink LBT sub-band, by receiving the high-layer signaling configuration.

When the UE receives the PDCCH scheduling PDSCH, the UE knows the downlink LBT sub-band receiving the PDCCH, and then according to the PRI value in the PDCCH scheduling PDSCH and the downlink LBT sub-band lookup table 3 of the PDCCH, a PUCCH resource subset can be obtained. For example, when the UE receives the PDCCH scheduling PDSCH in the downlink LBT sub-band 1, and the PRI value in the PDCCH scheduling PDSCH is "01", the PUCCH resource subset through which the UE transmits the HARQ-ACK is the PUCCH resource subset 2 configured by high-layer signaling.

Table 3 Mapping between the downlink LBT sub-band where the PDCCH is located, PUCCH resource indicator and PUCCH resource subset

TABLE 3

| downlink LBT sub-band where the PDCCH is located | PRI value | PUCCH resource subset |
|---|---|---|
| downlink LBT sub-band 1 | 00 | PUCCH resource subset 1 configured by high-layer signaling |
| | 01 | PUCCH resource subset 2 configured by high-layer signaling |
| | 10 | PUCCH resource subset 3 configured by high-layer signaling |
| | 11 | PUCCH resource subset 4 configured by high-layer signaling |
| downlink LBT sub-band 2 | 00 | PUCCH resource subset 3 configured by high-layer signaling |
| | 01 | PUCCH resource subset 4 configured by high-layer signaling |
| | 10 | PUCCH resource subset 5 configured by high-layer signaling |
| | 11 | PUCCH resource subset 6 configured by high-layer signaling |
| downlink LBT sub-band 3 | 00 | PUCCH resource subset 5 configured by high-layer signaling |
| | 01 | PUCCH resource subset 6 configured by high-layer signaling |
| | 10 | PUCCH resource subset 7 configured by high-layer signaling |
| | 11 | PUCCH resource subset 8 configured by high-layer signaling |
| downlink LBT sub-band 4 | 00 | PUCCH resource subset 7 configured by high-layer signaling |
| | 01 | PUCCH resource subset 8 configured by high-layer signaling |
| | 10 | PUCCH resource subset 1 configured by high-layer signaling |
| | 11 | PUCCH resource subset 2 configured by high-layer signaling |

In order to make the LBT result of the uplink LBT sub-band where at least one PUCCH resource indicated by the PRI is located is idle, it is better that the LBT result of the downlink LBT sub-band where the uplink LBT sub-band where the indicated at least one PUCCH resource is located is idle. In this way, the probability that the LBT result of the uplink LBT sub-band where the PUCCH resource is located is idle will increase, and the LBT result of the downlink LBT sub-band where the PDCCH containing the PRI is located must be idle. Therefore, at least one PUCCH resource indicated by the PRI is located in an uplink LBT sub-band in the same frequency band as the downlink LBT sub-band where the PDCCH containing the PRI is located. For example, the downlink LBT sub-band 1 and the uplink LBT sub-band 1 are in the same frequency band, the downlink LBT sub-band 1 and the uplink LBT sub-band 2 and the uplink LBT sub-band 3 are not in the same frequency band. The PRI contained in the PDCCH in the downlink LBT sub-band 1 indicates 2 PUCCH resources, which are PUCCH-1 and PUCCH-2. The PUCCH-1 and PUCCH-2 are located in different uplink LBT sub-bands. One of the PUCCH-1 and PUCCH-2 is located in the uplink LBT sub-band 1 and in the same frequency band as the downlink LBT sub-band that transmits the PDCCH containing PRI.
Method 3:

The UE determines whether to use method 1 or method 2 by receiving the high-layer signaling configuration. If the UE does not determine whether to use method 1 or method 2 by receiving the high-layer signaling configuration, the UE uses method 1 to determine the PUCCH resource transmitting HARQ-ACK.

When the PUCCH resource subset is jointly determined by the downlink LBT sub-band where the PDCCH containing the PRI is located and the PRI, the above description is the method for determining one PUCCH resource after the UE receives the PUCCH resources configured by the UE-specific high-layer signaling.

The method for determining the PUCCH resource before the UE does not receive the PUCCH resource configured by the UE-specific high-layer signaling may be as follows. The method for determining the PUCCH resource for the UE transmitting HARQ-ACK is divided into two steps. First, the UE obtains a PUCCH resource set by receiving system information (the system information can be a Master Information Block (MIB)) or a System Information Block (SIB). For example, the PUCCH set is {s0, s1, s2, s3, . . . , s7}, and then instructs to use one PUCCH resource by a field (refers as PUCCH Resource Indicator (PRI)) in the DCI of the PDCCH scheduling the PDSCH. The specific indication method is shown in Table 4.

TABLE 4

| PRI value | PUCCH resources |
| --- | --- |
| 000 | s0 |
| 001 | s1 |
| 010 | s2 |
| 011 | s3 |
| 100 | s4 |
| 101 | s5 |
| 110 | s6 |
| 111 | s7 |

Table 4: Mapping between PUCCH resource indicator and PUCCH resources

Or, the method for determining the PUCCH resource before the UE does not receive the PUCCH resource configured by the UE-specific high-layer signaling may be as follows. The UE may obtain the PUCCH resource set and the PUCCH resource subset through system information. For example, the PUCCH-set is divided into eight subsets, the number of PUCCH resources and which PUCCH resources are contained in each subset can be determined by UE through receiving system information. Then each PUCCH resource subset is indicated by a PRI of 3 bits, and the mapping between the PRI indicator value and the PUCCH resource subset is shown in Table 5. The mapping between the PRI and the PUCCH resource subset is independent of the downlink LBT sub-band where the PDCCH is received.

TABLE 5

| PRI value | PUCCH resource subset |
| --- | --- |
| 000 | PUCCH resource subset 1 |
| 001 | PUCCH resource subset 2 |
| 010 | PUCCH resource subset 3 |
| 011 | PUCCH resource subset 4 |
| 100 | PUCCH resource subset 5 |
| 101 | PUCCH resource subset 6 |
| 110 | PUCCH resource subset 7 |
| 111 | PUCCH resource subset 8 |

Table 5: Mapping between PUCCH resource indicator and PUCCH resource subset

Figure 4:
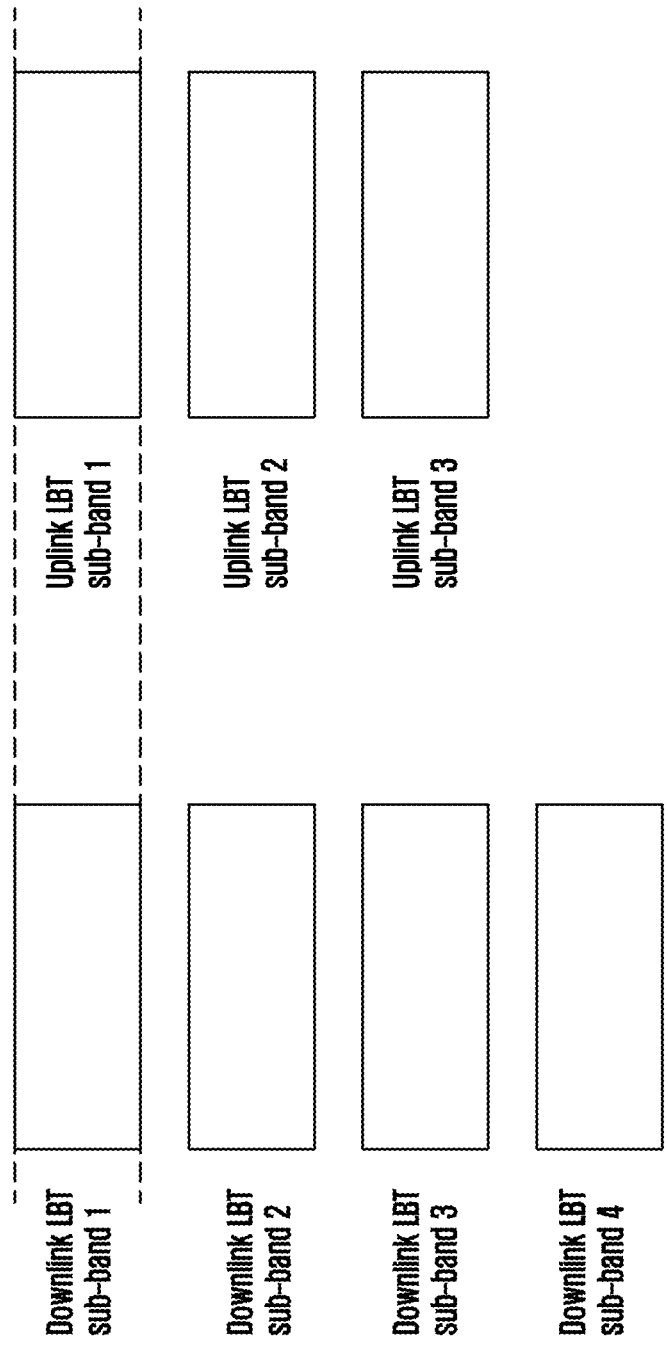
FIG. 4 is a schematic diagram of a PUCCH resource indicated by a PRI in a PDCCH transmitted on a downlink LBT sub-band in the same frequency band as an uplink LBT sub-band including at least a PUCCH of the uplink LBT sub-band according to an embodiment of the present application.

If a downlink LBT sub-band and an uplink LBT sub-band are in the same frequency band, that is, through time division multiplexing, as shown in FIG. 4, the downlink LBT sub-band 1 and the uplink LBT sub-band 1 are in the same frequency band, if the uplink LBT sub-band is configured with a PUCCH resource for transmitting HARQ-ACK, the PUCCH resource indicated by the PRI in the PDCCH transmitted in the downlink LBT sub-band which is in the same frequency band as the uplink LBT sub-band includes at least the PUCCH of the uplink LBT sub-band. For example, as shown in the table 3, the PRI value of the downlink LBT sub-band 1 is {00, 01, 10, 11}, the each PUCCH resource subset in the indicated PUCCH resource subset 1 configured by high-layer signaling, the indicated PUCCH resource subset 2 configured by high-layer signaling, the indicated PUCCH resource subset 3 configured by high-layer signaling, the indicated PUCCH resource subset 4 configured by high-layer signaling includes at least one PUCCH resource of four PUCCH resources {PUCCH-0, PUCCH-1, PUCCH-2, PUCCH-3} on the uplink LBT sub-band.

Embodiment 2

Figure 5:
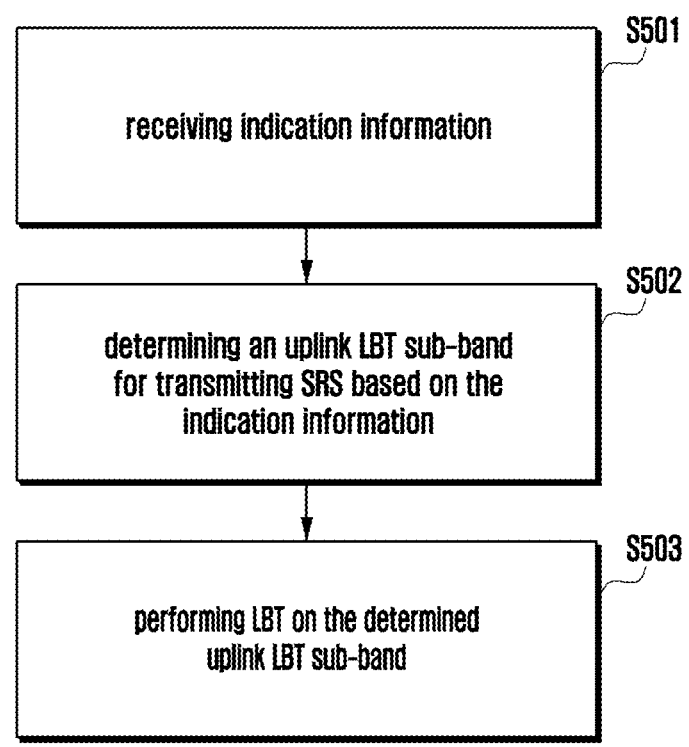
FIG. 5 is a flowchart of an LBT execution method according to an embodiment of the present disclosure.

FIG. 5 shows a flowchart of an LBT execution method according to an embodiment of the present disclosure. The method can be executed by a UE, as shown in FIG. 5, the method may mainly include the following steps.

Step S501: indication information is acquired.

The indication information is specifically information for determining an uplink LBT sub-band (band resource for SRS transmission) for SRS transmission. LBT sub-band refers to one or more sub-bands included in the bandwidth of BWP in the unauthorized frequency band. The bandwidth of BWP generally includes at least two uplink LBT sub-bands. The BWP in the embodiment of the disclosure refers to an activated BWP. Since SRR transmission is performed on an unauthorized frequency band, LBT is required for the uplink LBT sub-band (i.e., sub-band resources occupied by SRS when SRS transmission is performed) used for SRS transmission before the SRS transmission.

In the embodiment of the disclosure, the indication information may be display information or implicit information.

Step S502: an uplink LBT sub-band for transmitting SRS is determined according to the indication information.

Step S503: LBT is performed on the determined uplink LBT sub-band.

Specifically, after determining the uplink LBT sub-band for transmitting SRS, LBT can be performed on the frequency domain resources of the determined one or more uplink LBT sub-bands, so as to transmit SRS according to the LBT result.

In a wireless communication system, SRS is used by base stations to estimate uplink channel quality and other information in different frequency bands. In the unauthorized frequency band, in order to avoid mutual interference between LAA system and other wireless systems, the UE needs to perform LBT on the sub-bands used for SRS transmission before transmitting SRS on the activated BWP. Only when the LBT result is idle can SRS be transmitted on these sub-bands. However, the BWP may include a plurality of uplink LBT sub-bands, so which uplink LBT sub-band or sub-bands are occupied by SRS resources requiring LBT before transmitting SRS need to be determined first.

SRS is aperiodic SRC or periodic SRS. The periodic SRS can be configured by Radio Resource Control (RRC), while the aperiodic SRS is usually triggered by downlink control information carried in the PDCCH, specifically triggered by the SRS request field in a Physical Downlink Control Channel (PDCCH).

In an alternative embodiment of the present disclosure, for an aperiodic SRS, the SRS is triggered by the SRS request field in the PDCCH, specifically triggered by the SRS request field in the PDCCH scheduling Physical Downlink Shared Channel (PDSCH). It may also be driven by the SRS request field in the PDCCH for scheduling Physical Uplink Shared Channel (PUSCH), or it may be triggered by the SRS request field in the dedicated PDCCH that is specially used to trigger the aperiodic SRS.

The SRS transmission method provided by the embodiment of the present disclosure can determine one or more LBT sub-bands for SRS transmission when the bandwidth of BWP includes at least two uplink LBT sub-bands. Specifically, before transmitting SRS, the uplink LBT sub-band for transmitting SRS can be determined according to the indication information for determining the uplink LBT sub-band for transmitting SRS, and then LBT can be performed on the determined uplink LBT sub-band, and whether to transmit SRS or not can be performed according to the LBT result.

Specifically, the above SRS transmission according to the LBT result includes: transmitting SRS if the LBT result is idle; transmitting no SRS if the LBT result is not idle.

If the LBT result is Idle (i.e., idle), it indicates that the uplink LBT sub-band for transmitting SRS is idle and can be used for SRS transmission. On the contrary, if the LBT result is not idle, that is, it is busy, SRS transmission cannot be performed on the uplink LBT sub-band for transmitting SRS to avoid mutual interference with other wireless systems.

It should be noted that in practical applications, different schemes may be configured to determine the uplink LBT sub-band for transmitting SRS. Therefore, the above indication information may be different for different configuration schemes. The following description will be made in connection with specific embodiments provided by the examples of the present disclosure.

In an alternative embodiment of the present disclosure, SRS is aperiodic SRS, and the indication information in step S501 may specifically include at least one of the following: downlink LBT sub-band where PDCCH is located, indication information carried in PDCCH, and downlink LBT sub-band in BWP (configured by base station for UE).

It can be understood that the BWP configured above refers to the BWP in the activated state among the configured BWPs.

As can be seen from the foregoing description, the PDCCH may be PDCCH for scheduling PDSCH, PDCCH for scheduling PUSCH, or a dedicated PDCCH.

If the PDCCH is PDCCH for scheduling PDSCH or a dedicated PDCCH, the indication information carried in the PDCCH may specifically include a value of an SRS request field and/or a value of a field for indicating an uplink LBT sub-band for transmitting SRS.

If the PDCCH is PDCCH for scheduling PUSCH, the indication information carried in the PDCCH includes at least one of the following: value of an SRS request field; information indicating an uplink LBT sub-band for transmitting PUSCH; and value of the field indicating the uplink LBT sub-band for transmitting SRS.

Specifically, when the UE needs to transmit uplink PUSCH data, the base station will allocate uplink resources to the UE and transmit them to the UE through PDCCH, so that the UE can transmit PUSCH data on the uplink resources designated by the base station. In the unauthorized frequency band, the UE also needs to perform LBT on the uplink LBT sub-band for transmitting PUSCH before transmitting PUSCH data. When the aperiodic SRS is triggered by the PDCCH scheduling PUSCH, the PDCCH may carry information of the uplink LBT sub-band (i.e., the uplink LBT sub-band for transmitting PUSCH) indicated by the base station that LBT is required before transmitting PUSCH data. Therefore, if the SRS request field in the PDCCH triggers the need for SRS transmission at this time, a scheme for determining the uplink LBT sub-band for transmitting SRS according to the uplink LBT sub-band for transmitting PUSCH data can be configured. Using this method to determine the uplink LBT sub-band for transmitting SRS, the SRS can provide channel measurement signals for uplink PUSCH transmission that may be transmitted, while saving indication information.

It can be seen that in the scheme provided by the embodiment of the present disclosure, for the aperiodic SRS triggered by a PDCCH scheduling PDSCH or a dedicated PDCCH, the uplink LBT sub-band of LBT is required before transmitting SRS, that is, the uplink LBT sub-band for transmitting SRS. It can be determined by at least one of the following four factors: the downlink LBT sub-band in which the PDCCH including SRS request field is located, the downlink LBT sub-band in which the LBT result in BWP is idle (that is, the sub-band is idle), the SRS request field, and the field indicating the uplink LBT sub-band for transmitting SRS. For the aperiodic SRS triggered by the PDCCH scheduling PUSCH, it can be determined by at least one of the following five factors: the downlink LBT sub-band in which the PDCCH including SRS request field is located, the downlink LBT sub-band in which the LBT result in BWP is idle, the SRS request field, the uplink LBT sub-band for transmitting PUSCH, and the field for indicating the uplink LBT sub-band for transmitting SRS.

In an alternative embodiment of the present disclosure, the indication information may include the values of the downlink LBT sub-band where PDCCH is located and the SRS request field. At this time, in step S502, the step of determining an uplink LBT sub-band for transmitting SRS according to the indication information may specifically include: determining an uplink LBT sub-band for transmitting SRS according to a downlink LBT sub-band where PDCCH is located, a value of a SRS request field, and a first mapping relationship; where the first mapping relationship is a mapping relationship between each downlink LBT sub-band, each value (i.e., the value of each SRS request field), and each uplink LBT sub-band.

It should be noted that the mapping relationship between each downlink LBT sub-band, each value, and each uplink LBT sub-band can specifically be a one-to-one mapping relationship, a one-to-many mapping relationship, or a many-to-many mapping relationship. For example, it may be a downlink LBT sub-band and a value corresponding to an LBT sub-band, or it may be a downlink LBT sub-band and a value corresponding to a plurality of LBT sub-bands, i.e. corresponding to a set of LBT sub-bands, which may contain the identification of a plurality of LBT sub-bands.

Specifically, in practical application, the above-mentioned first mapping relationship may be preconfigured. When a terminal equipment needs to transmit SRS, it may determine one or more LBT sub-bands corresponding to the downlink LBT sub-bands where the PDCCH triggering the SRS transmission is located and the value of the SRS request field in the PDCCH through the mapping relationship.

By adopting the method, the LBT sub-band for transmitting SRS can be flexibly determined through the value of the SRS request field, and indication information can be saved at the same time. The LBT sub-band for transmitting SRS is determined according to the downlink LBT sub-band where PDCCH is located. Because the downlink LBT sub-band where PDCCH is located is idle, the probability that the LBT sub-band for transmitting SRS determined according to the downlink LBT sub-band where PDCCH is located is increased.

It can be understood that the PDCCH in this scheme can be a PDCCH scheduling PDSCH, a PDCCH scheduling PUSCH, or a dedicated PDCCH for triggering aperiodic SRS.

The scheme for determining the LBT sub-band for transmitting SRS based on the downlink LBT sub-band where PDCCH is located and the value of the SRS request field will be further described below with reference to specific examples.

Example

In this example, an example will be described in which an aperiodic SRS is triggered by an SRS request field in a PDCCH in which a PDSCH is scheduled. For transmitting an aperiodic SRS in an unauthorized frequency band, a UE needs to perform LBT on the uplink LBT sub-band used for SRS transmission before transmitting aperiodic SRS. Only when the LBT result is idle can SRS be transmitted, otherwise the SRS cannot be transmitted, and a BWP can include a plurality of uplink LBT sub-bands, then the bandwidth for performing LBT, that is, which uplink LBT sub-bands the frequency domain resource includes, needs to be determined first. Specifically, it is necessary to determine the number and location of uplink LBT sub-bands occupied by SRS resources for LBT before SRS transmission, that is, uplink LBT sub-bands for SRS transmission.

Figure 6:
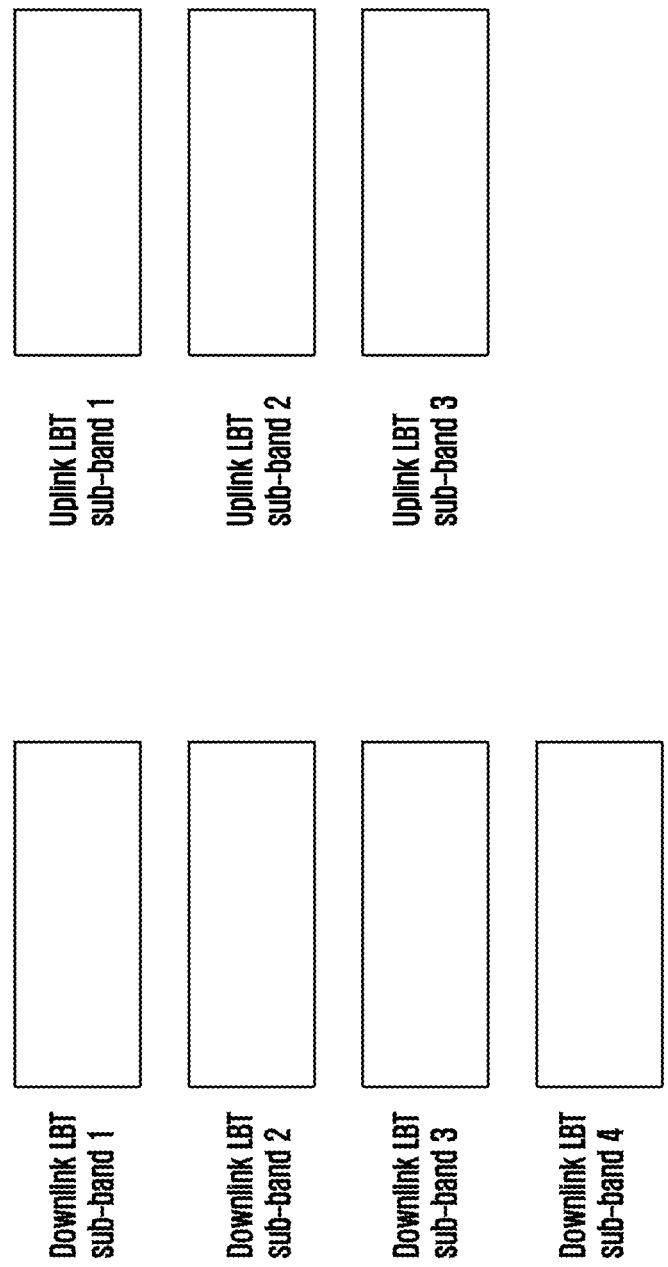
FIG. 6 is a schematic diagram of a downlink LBT sub-band and an uplink LBT sub-band configured by a base station to a UE using a high layer signaling according to an example of the disclosure.

In this example, it is assumed that the base station configures 3 uplink LBT sub-bands for the UE, which are: uplink LBT sub-band 1, uplink LBT sub-band 2 and uplink LBT sub-band 3, the three uplink sub-bands belonging to one BWP of one serving cell; the base station configures 4 downlink LBT sub-bands for the UE, which are: downlink LBT sub-band 1, downlink LBT sub-band 2, downlink LBT sub-band 3 and downlink LBT sub-band 4, as shown in FIG. 6.

Assuming that the downlink LBT sub-band in which the PDCCH including SRS request field is located is a downlink LBT sub-band 1, the set of uplink LBT sub-bands occupied by SRS resources configured by higher layer signaling is as follows:

uplink LBT sub-band set 1 is {uplink LBT sub-band 1}, that is, the set 1 includes an uplink LBT sub-band 1;

LBT sub-band set 2 is (uplink LBT sub-band 1, uplink LBT sub-band 2), that is, the set 2 includes an uplink LBT sub-band 1 and an uplink LBT sub-band 2;

LBT sub-band set 3 is {uplink LBT sub-band 1, uplink LBT sub-band 2, and uplink LBT sub-band 3}, that is, the set 3 includes an uplink LBT sub-band 1, an uplink LBT sub-band 2, and an uplink LBT sub-band 3.

It is assumed that the first mapping relationship is shown in Table 6 below:

TABLE 6

| Downlink LBT sub-band where PDCCH is located | value of the SRS request field | Uplink LBT sub-band occupied by SRS resources |
|---|---|---|
| Downlink LBT sub-band 1 | 00 | No SRS request |
| | 01 | LBT sub-band set 1 occupied by SRS resources configured by high layer signaling |
| | 10 | LBT sub-band set 2 occupied by SRS resources configured by high layer signaling |
| | 11 | LBT sub-band set 3 occupied by SRS resources configured by high layer signaling |
| Downlink LBT sub-band 2 | 00 | No SRS request |
| | 01 | LBT sub-band set 3 occupied by SRS resources configured by high layer signaling |
| | 10 | LBT sub-band set 2 occupied by SRS resources configured by high layer signaling |
| | 11 | LBT sub-band set 1 occupied by SRS resources configured by high layer signaling |
| Downlink LBT sub-band 3 | 00 | No SRS request |
| | 01 | LBT sub-band set 1 occupied by SRS resources configured by high layer signaling |
| | 10 | LBT sub-band set 3 occupied by SRS resources configured by high layer signaling |
| | 11 | LBT sub-band set 2 occupied by SRS resources configured by high layer signaling |
| Downlink LBT sub-band 4 | 00 | No SRS request |
| | 01 | LBT sub-band set 2 occupied by SRS resources configured by high layer signaling |
| | 10 | LBT sub-band set 1 occupied by SRS resources configured by high layer signaling |
| | 11 | LBT sub-band set 3 occupied by SRS resources configured by high layer signaling |

As can be seen from Table 6, when the value of the SRS request field in a PDCCH (the value of the SRS request field shown in the figure) is a non-00 value, the SRS request field triggers an aperiodic SRS, that is, the aperiodic SRS needs to be transmitted. At this time, the uplink LBT sub-band contained in the set, that is, the uplink LBT sub-band occupied by SRS resources, can be determined based on the downlink LBT sub-band where PDCCH is located and the value of the SRS request field through the above mapping relationship.

In another example, it is assumed that the base station configures 5 uplink LBT sub-bands for the UE, which are: uplink LBT sub-band 1, uplink LBT sub-band 2, uplink LBT sub-band 3, uplink LBT sub-band 4, and uplink LBT sub-band 5, the five uplink sub-bands belonging to one BWP of one serving cell; the base station configures 4 downlink LBT sub-bands for the UE, which are: downlink LBT sub-band 1, downlink LBT sub-band 2, downlink LBT sub-band 3, and downlink LBT sub-band 4.

It is assumed that downlink LBT sub-band 1 and uplink LBT sub-band 1 belong to one pair, with the same frequency domain location, downlink LBT sub-band 2 and uplink LBT sub-band 2 belong to one pair, with the same frequency domain location, downlink LBT sub-band 3 and uplink LBT sub-band 3 belong to one pair, with the same frequency domain location, and downlink LBT sub-band 4 and uplink LBT sub-band 4 belong to one pair, with the same frequency domain location, that is to say, downlink LBT sub-band 1 corresponds to uplink LBT sub-band 1, downlink LBT sub-band 2 corresponds to uplink LBT sub-band 2, downlink LBT sub-band 3 corresponds to uplink LBT sub-band 3, and downlink LBT sub-band 4 corresponds to uplink LBT sub-band 4.

It is assumed that the first mapping relationship in this example is shown in Table 7 below, where LBT sub-band set 1, LBT sub-band set 2, . . . , LBT sub-band set occupied by SRS resources in Table 7 are uplink LBT sub-band sets configured by a base station through a high layer signaling, and each set may include one or more uplink LBT sub-bands. As shown in Table 7, it is assumed that the downlink LBT sub-band in which the PDCCH triggering SRS is located is downlink sub-band 2, and the value of the SRS request field in the PDCCH (value of the SRS request field shown in Table) is 11, the uplink LBT sub-band for transmitting SRS is each uplink LBT sub-band included in LBT sub-band set 4, that is, the sub-band in which LBT needs to be performed.

TABLE 7

| Downlink LBT sub-band where PDCCH is located | value of the SRS request field | Uplink LBT sub-band occupied by SRS resources |
| --- | --- | --- |
| Downlink LBT sub-band 1 | 00 | No SRS request |
|  | 01 | Uplink LBT sub-band 1 corresponding to downlink LBT sub-band |
|  | 10 | LBT sub-band set 1 occupied by SRS resources configured by high layer signaling |
|  | 11 | LBT sub-band set 2 occupied by SRS resources configured by high layer signaling |
| Downlink LBT sub-band 2 | 00 | No SRS request |
|  | 01 | Uplink LBT sub-band corresponding to downlink LBT sub-band 2 |
|  | 10 | LBT sub-band set 3 occupied by SRS resources configured by high layer signaling |
|  | 11 | LBT sub-band set 4 occupied by SRS resources configured by high layer signaling |
| Downlink LBT sub-band 3 | 00 | No SRS request |
|  | 01 | Uplink LBT sub-band corresponding to downlink LBT sub-band 3 |
|  | 10 | LBT sub-band set 5 occupied by SRS resources configured by higher layer signaling |
|  | 11 | LBT sub-band set 6 occupied by SRS resources configured by higher layer signaling |
| Downlink LBT sub-band 4 | 00 | No SRS request |
|  | 01 | LBT sub-band set 7 occupied by SRS resources configured by higher layer signaling |
|  | 10 | LBT sub-band set 8 occupied by SRS resources configured by high layer signaling |
|  | 11 | LBT sub-band set 9 occupied by SRS resources configured by higher layer signaling |

It should be noted that the mapping relationships shown in Table 6 and Table 7 are only examples. In practical applications, different configurations and adjustments can be made according to actual needs. Specifically, corresponding mapping relationships can be configured according to each uplink LBT sub-band, downlink LBT sub-band configured for the UE by the base station, and uplink LBT sub-band set occupied by SRS resources configured by high layer signaling. The corresponding relation of the mapping relation can be agreed through protocols, or determined by the UE according to a received high-level instruction or a physical layer instruction.

It can be understood that the above embodiment or the scheme in the example is equally applicable to the aperiodic SRS triggered by the SRS request field in the PDCCH scheduling PUSCH and the aperiodic SRS triggered by the SRS request field in the dedicated PDCCH. It is only necessary to replace the downlink LBT sub-band in which the PDCCH scheduling PDSCH is located in the above example with the downlink LBT sub-band in which the PDCCH scheduling PUSCH is located, or replace the PDCCH scheduling PDSCH with the LBT sub-band in which the dedicated PDCCH is located.

In an alternative embodiment of the present disclosure, the indication information in step S501 may include an idle downlink LBT sub-band in BWP, and the step of determining an uplink LBT sub-band for transmitting SRS according to the indication information includes: determining an uplink LBT sub-band corresponding to the idle downlink LBT sub-band as an uplink LBT sub-band for transmitting SRS; or determining an uplink LBT sub-band corresponding to the downlink LBT sub-band satisfying a predetermined condition among idle downlink LBT sub-bands as an uplink LBT sub-band for transmitting SRS.

That is, there may be a predetermined or preconfigured correspondence between the uplink LBT sub-band and the downlink LBT sub-band. At this time, before transmitting SRS, the uplink LBT sub-band for transmitting SRS can be determined according to the idle downlink LBT sub-band according to the learned downlink LBT sub-band in BWP. For example, the uplink LBT sub-band corresponding to the idle downlink LBT sub-band is directly determined as the uplink LBT sub-band for transmitting SRS, or the uplink LBT sub-band corresponding to some LBT sub-bands satisfying predetermined conditions in the idle downlink LBT sub-band is determined as the uplink LBT sub-band for transmitting SRS.

Alternatively, a pair of corresponding uplink LBT sub-bands and downlink LBT sub-bands may specifically refer to the uplink LBI sub-band and the downlink LBT sub-band located at the same frequency domain location.

The downlink LBT sub-band (i.e., the downlink LBT sub-band in BWP) whose LBT result in BWP is idle can be determined by receiving a group common control signaling. However, the specific downlink LBT sub-bands mentioned above can be specified in advance between the UE and the base station, or can be determined by the UE based on information received from the base station (e.g., higher layer signaling or physical layer signaling, etc.).

In an alternative embodiment of the present disclosure, the downlink LBT sub-band satisfying a predetermined condition can specifically be M sub-bands located at a specified frequency domain location in the idle downlink LBT sub-band, where $M \geq 1$.

Specifically, the specific location of the above-mentioned designated frequency domain location can be configured according to actual requirements, specifically it can be agreed between the UE and the base station, or it can be determined by the UE according to relevant indication information received from the base station, such as according to the high layer signaling or the physical signaling received from the base station.

As an alternative, the above-mentioned designated frequency domain location may be a location in front of the bandwidth intermediate frequency domain location or some specific location. For example, it is the downlink LBT sub-band with the highest frequency domain location among the idle downlink LBT sub-bands.

In an alternative embodiment of the present disclosure, the above M≥2, and the M sub-bands may be M sub-bands with continuous frequency domain locations.

That is, the downlink LBT sub-band satisfying the predetermined condition may be M continuous sub-bands located at the specified frequency domain location in the idle downlink LBT sub-band, for example, it may be M continuous sub-bands located in front of the intermediate frequency domain location of the downlink LBT sub-band in BWP, and if M=2, it may be two continuous downlink LBT sub-bands located in front of the frequency domain location. By adopting the method, the LBT sub-band for transmitting SRS is determined according to the downlink LBT sub-band where PDCCH is located and the idle downlink LBT sub-band, because the downlink LBT sub-band where PDCCH is located is idle, the probability of the LBT sub-band determined according to PDCCH for SRS transmission being idle is increased, and indication information can be saved.

The scheme for determining the uplink LBT sub-band for transmitting SRS according to the downlink LBT sub-band in BWP will be further described below with specific examples.

Example

For transmitting an aperiodic SRS on an unauthorized frequency band, since UE needs to perform LBT on the uplink LBT sub-band used for SRS transmission before transmitting SRS, SRS can be transmitted only when the LBT result is idle, otherwise SRS cannot be transmitted, and the uplink LBT sub-band occupied by the SRS resource for performing LBT before transmitting SRS can be determined according to the downlink LBT sub-band in BWP where the LBT result in BWP is idle (wherein the downlink LBT sub-band in BWP is determined by receiving a group common control signaling).

It is assumed that the LBT sub-band occupied by SRS resources (i.e., the uplink LBT sub-band) for the uplink LBT sub-band for transmitting SRS is an uplink LBT sub-band corresponding to the downlink LBT sub-band in BWP or the downlink LBT sub-band in the sub-set of this set whose LBT result is idle.

For example, the base station configures 3 uplink LBT sub-bands for the UE, which are: uplink LBT sub-band 1, uplink LBT sub-band 2 and uplink LBT sub-band 3, the three uplink sub-bands belonging to one BWP of one serving cell; the base station configures 4 downlink LBT sub-bands for the UE, which are: downlink LBT sub-band 1, downlink LBT sub-band 2, downlink LBT sub-band 3, downlink LBT sub-band 4, and the sequence of the four downlink LBT sub-bands according to the frequency domain locations is as follows: downlink LBT sub-band 1, downlink LBT sub-band 2, downlink LBT sub-band 3, and downlink LBT sub-band 4. Wherein, it is assumed that downlink LBT sub-band 1 and uplink LBT sub-band 1 belong to a pair with the same frequency domain location, downlink LBT sub-band 2 and uplink LBT sub-band 2 belong to a pair with the same frequency domain location, downlink LBT sub-band 3 and uplink LBT sub-band 3 belong to a pair with the same frequency domain location, that is, downlink LBT sub-band 1 corresponds to uplink LBT sub-band 1, downlink LBT sub-band 2 corresponds to uplink LBT sub-band 2, and downlink LBT sub-band 3 corresponds to uplink LBT sub-band 3.

Figure 7:
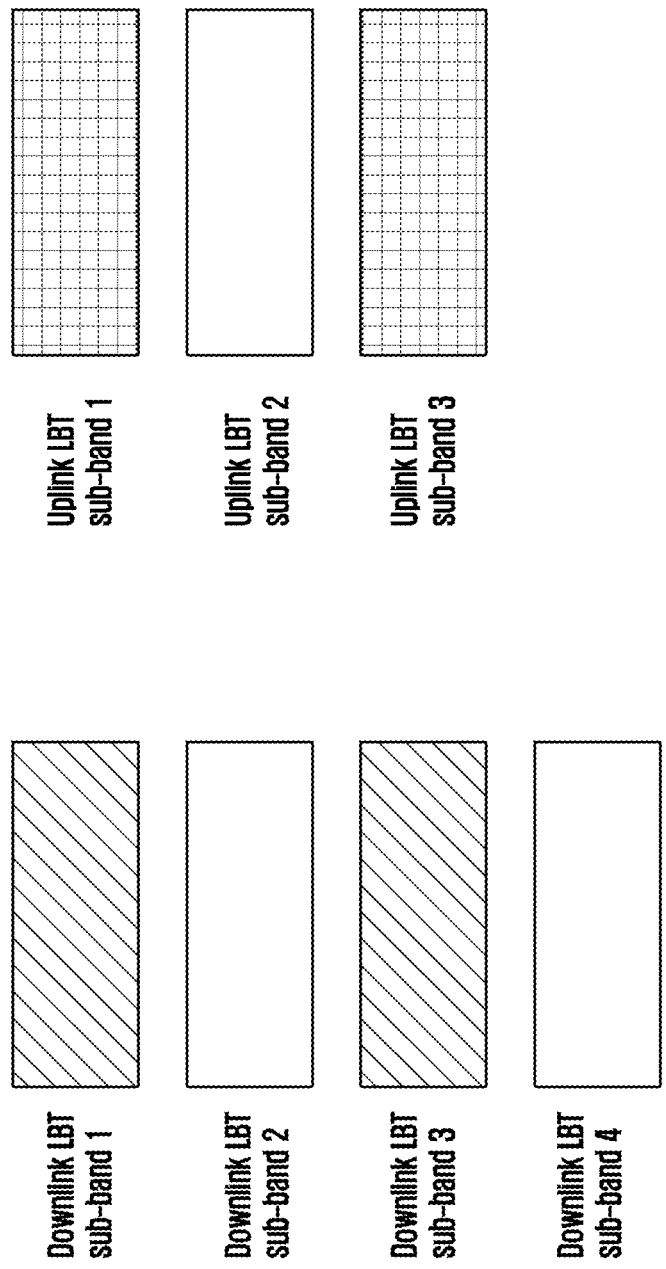
FIG. 7 is a schematic diagram of a scheme for determining an uplink LBT sub-band for transmitting SRS based on a downlink LBT sub-band in a BWP according to an example of the disclosure.

In one example, it is assumed that the set of downlink LBT sub-bands whose LBT result in BWP is idle is {downlink LBT sub-band 1, downlink LBT sub-band 3}, that is, the idle downlink LBT sub-bands are downlink LBT sub-band 1 and downlink LBT sub-band 3. If the LBT sub-band for transmitting SRS is the uplink LBT sub-band corresponding to the downlink LBT sub-band in the set of downlink LBT sub-bands whose LBT result in BWP is idle, the uplink LBT sub-band 1 and the uplink LBT sub-band 3 corresponding to the downlink LBT sub-band 1 and the downlink LBT sub-band 3 in this example are the uplink LBT sub-bands for SRS transmission. As shown in FIG. 7, among the sub-bands shown in the figure, the downlink sub-band indicated by the filled rectangle is the idle downlink LBT sub-band, and correspondingly, the uplink LBT sub-band corresponding to the idle downlink LBT sub-band (with the filled uplink LBT sub-band in the figure) is the uplink LBT sub-band for transmitting SRS.

Figure 8:
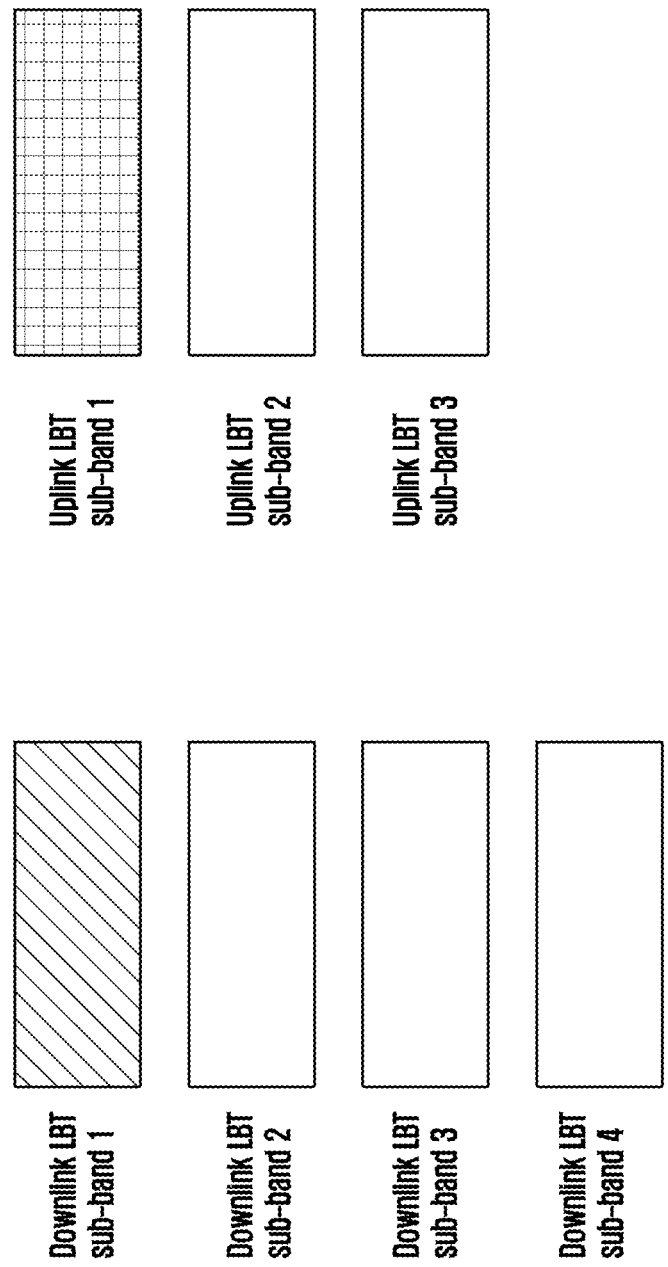
FIG. 8 is a schematic diagram of a scheme according to an example of the disclosure to determine an uplink LBT sub-band corresponding to a downlink LBT sub-band at a specified frequency domain location among downlink LBT sub-bands in a BWP as an uplink LBT sub-band for transmitting SRS.

In another example, it is assumed that the set of downlink LBT sub-bands whose LBT result in BWP is idle is {downlink LBT sub-band 1, downlink LBT sub-band 3}, if the uplink LBT sub-band for transmitting SRS (i.e., LBT sub-band occupied by SRS resources for LBT before SRS transmission) is the uplink LBT sub-band corresponding to the first sub-band in front of the intermediate frequency domain of the idle downlink LBT sub-band, the uplink LBT sub-band for transmitting SRS is uplink LBT sub-band 1 corresponding to downlink LBT sub-band 1. As shown in FIG. 8, the idle downlink LBT sub-band is the downlink LBT sub-band 1 with padding shown in the figure, and the uplink LBT sub-band 1 corresponding to the downlink LBT sub-band is the uplink LBT sub-band for transmitting SRS.

In yet another example, it is assumed that the set of downlink LBT sub-bands whose LBT result in BWP is idle is {downlink LBT sub-band 1, downlink LBT sub-band 2, downlink LBT sub-band 4}, if the uplink LBT sub-band for transmitting SRS (i.e., LBT sub-band occupied by SRS resources for LBT before SRS transmission) is an uplink LBT sub-band corresponding to two consecutive sub-bands in front of the intermediate frequency domain of the idle downlink LBT sub-band, then the uplink LBT sub-band for transmitting SRS at this time is uplink LBT sub-band 1 and uplink LBT sub-band 2 corresponding to downlink LBT sub-band 1 and downlink LBT sub-band 2.

In an alternative embodiment of the present disclosure, the indication information in step S501 includes the downlink LBT sub-band in BWP and the value of the SRS request field, and the step of determining an uplink LBT sub-band for transmitting SRS according to the indication information includes: determining an uplink LBT sub-band for transmitting SRS according to an idle downlink LBT sub-band, a value of the SRS request field, and a second mapping relationship; where the second mapping relationship is a mapping relationship between each downlink sub-band, each value (i.e., the value of each SRS request field), and each uplink LBT sub-band.

Similarly, the mapping relationship between each downlink LBT sub-band, each value, and each uplink LBT sub-band can be specifically a one-to-one mapping relationship, a one-to-many mapping relationship, or a many-to-many relationship. For example, it may be a downlink LBT sub-band and a value corresponding to an LBT sub-band, or it may be a downlink LBT sub-band and a value corresponding to a plurality of LBT sub-bands, i.e. corresponding to an LBT set. The set may contain the identification of a plurality of LBT sub-bands, or it may be a plurality of downlink LBT sub-bands and a value corresponding to one or more uplink LBT sub-bands.

As an example, Table 8 shows a partial mapping relationship in the second mapping relationship. As can be seen from the table, the table specifically shows a set of idle downlink LBT sub-bands, the value of the SRS request field (value of the SRS request field in the table), and the corresponding relationship of downlink LBT sub-bands (LBT sub-bands occupied by SRS resources for LBT before SRS transmission in the table) for SRS transmission.

TABLE 8

| Set of downlink LBT sub-bands whose LBT result in BWP is idle | value of the SRS request field | LBT sub-band occupied by SRS resources for LBT before SRS transmission |
| --- | --- | --- |
| Downlink LBT sub-band 1, downlink LBT sub-band 2 | 00 | No SRS request |
|  | 01 | Uplink LBT sub-band 1 |
|  | 10 | Uplink LBT sub-band 2 |
|  | 11 | Uplink LBT sub-band 1, uplink LBT sub-band 2 |

Based on this mapping relationship, it is assumed that the downlink LBT sub-band whose LBT result in BWP is idle is downlink LBT sub-band 1 and downlink LBT sub-band 2, and the value of the SRS request field in PDCCH is 01, then the LBT sub-band for transmitting SRS is uplink LBT sub-band 1 at this time.

In an alternative embodiment of the present disclosure, the indication information in step S501 includes the downlink LBT sub-band in BWP and the downlink LBT sub-band where PDCCH is located, and the step of determining an uplink LBT sub-band for transmitting SRS according to the indication information includes: determining the uplink LBT sub-band corresponding to the downlink LBT sub-band in which PDCCH is located in the idle downlink LBT sub-band and/or the uplink LBT sub-band corresponding to the downlink LBT sub-band in which PDCCH is located in the idle downlink LBT sub-band satisfying a specific frequency domain location relationship as the uplink LBT sub-band for transmitting SRS.

That is, the uplink LBT sub-band corresponding to the downlink LBT sub-band where the PDCCH triggering the aperiodic SRS is located in the idle downlink LBT sub-band may be determined as the uplink LBT sub-band for transmitting SRS. It is also possible to determine the uplink LBT sub-band corresponding to the downlink LBT sub-band satisfying a certain relationship with the downlink LBT sub-band where PDCCH triggering aperiodic SRS is located in the idle downlink LBT sub-band, as the uplink LBT sub-band for transmitting SRS.

The above-mentioned specific frequency-domain location relationship can be configured according to actual requirements, which can be specifically agreed between the UE and the base station, or can be configured by the base station to the UE. As an alternative, the specific frequency domain location relationship may be a downlink LBT sub-band that is continuous with the downlink LBT sub-band in which PDCCH is located. In this case, the uplink LBT sub-band for transmitting SRS may be an uplink LBT sub-band corresponding to the downlink LBT sub-band in which PDCCH is located in the idle downlink LBT sub-band, and/or an uplink LBT sub-band corresponding to the downlink LBT sub-band in which PDCCH is located in the idle downlink LBT sub-band.

As an example, it is assumed that the base station configures 3 uplink LBT sub-bands for the UE, which are: uplink LBT sub-band 1, uplink LBT sub-band 2 and uplink LBT sub-band 3, the three uplink sub-bands belonging to one BWP of one serving cell; the base station configures 4 downlink LBT sub-bands for the UE, which are: downlink LBT sub-band 1, downlink LBT sub-band 2, downlink LBT sub-band 3, and downlink LBT sub-band 4, wherein downlink LBT sub-band 1 and uplink LBT sub-band 1 belong to one pair with the same frequency domain location, downlink LBT sub-band 2 and uplink LBT sub-band 2 belong to one pair with the same frequency domain location, downlink LBT sub-band 3 and uplink LBT sub-band 3 belong to one pair with the same frequency domain location.

Figure 9:
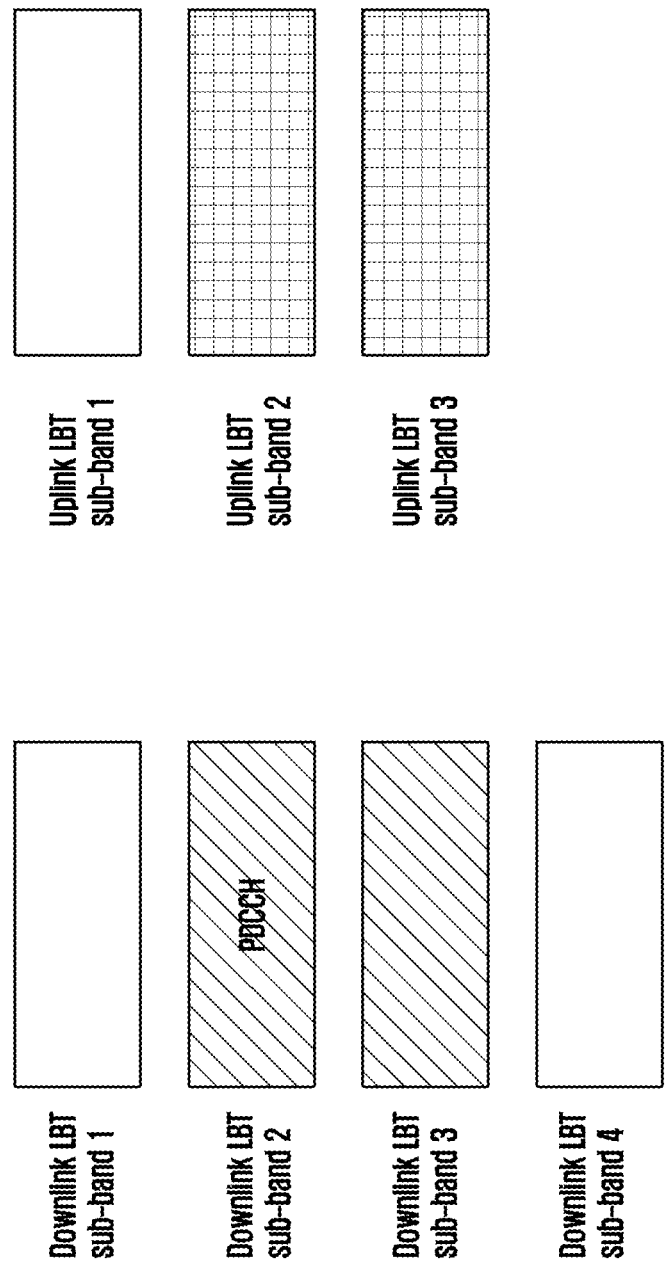
FIG. 9 is a schematic diagram of a scheme according to an example of the disclosure to determine the downlink LBT sub-bands where PDCCH is located and the corresponding uplink LBT sub-band of the continuous and idle LBT downlink sub-band among the sub-bands, as the uplink LBT sub-band for transmitting SRS.

In this example, it is assumed that the set of downlink LBT sub-bands whose LBT result in BWP is idle is {downlink LBT sub-band 2, downlink LBT sub-band 3}, and the downlink LBT sub-band where PDCCH including SRS request field is downlink LBT sub-band 2. As an alternative, if the uplink LBT sub-band for transmitting SRS is an uplink LBT sub-band corresponding to the downlink LBT sub-band where PDCCH is located in the idle downlink LBT sub-band, then the LBT sub-band for transmitting SRS is uplink LBT sub-band 2 corresponding to downlink LBT sub-band 2. As another alternative, it is assumed that in order to transmit the uplink LBT sub-band of SRS, it includes the uplink LBT sub-band corresponding to the downlink LBT sub-band where PDCCH is located in the idle downlink LBT sub-band, and the uplink LBT sub-band corresponding to the continuous downlink LBT sub-band in the downlink LBT sub-band where PDCCH is located in the idle downlink LBT sub-band. At this time, the downlink LBT sub-band where PDCCH is located is downlink LBT sub-band 2, and the downlink LBT sub-band in the idle downlink LBT sub-band that is continuous with the frequency domain location of downlink LBT sub-band 2 is downlink LBT sub-band 3, then the uplink LBT sub-band for transmitting SRS is uplink LBT sub-band 2 and uplink LBT sub-band 3 corresponding to downlink LBT sub-band 2 and downlink LBT sub-band 3. As shown in FIG. 9, the uplink LBT sub-band indicated by the rectangular frame with padding is an idle LBT sub-band, and the uplink LBT sub-band indicated by the rectangular frame with padding is an uplink LBT sub-band for transmitting SRS.

In an alternative embodiment of the present disclosure, the indication information in step S501 includes a value of a field for indicating an uplink LBT sub-band for transmitting SRS, and the step of determining an uplink LBT sub-band for transmitting SRS according to the indication information includes: determining an uplink LBT sub-band for transmitting SRS according to a value of a field indicating an uplink LBT sub-band for transmitting SRS and a third mapping relationship; the third mapping relationship is a mapping relationship between each value (i.e., each value of a field indicating an uplink LBT sub-band for transmitting SRS) and each uplink LBT sub-band.

As an alternative, the PDCCH including SRS request field is configured with a field specially used for indicating the uplink LBT sub-band for transmitting SRS. According to the value of the field and the third mapping relationship, the uplink LBT sub-band required for SRS transmission can be determined, that is, the uplink LBT sub-band occupied by SRS resources is indicated by the uplink LBT sub-band occupied by SRS resources in the PDCCH including SRS request field. Similarly, in the third mapping relationship, the mapping relationship between each value and each uplink LBT sub-band may be a one-to-one mapping relationship or a one-to-many mapping relationship. By adopting the method, the uplink LBT sub-band for transmitting SRS can be flexibly and directly indicated.

As an example, Table 9 shows a schematic of a third mapping relationship. As shown in the table, when the value of the field indicating the uplink LBT sub-band for transmitting SRS (indication value that SRS resources occupy the uplink LBT sub-band field shown in the table) in PDCCH is 00, the corresponding uplink LBT sub-band for transmitting SRS (uplink LBT sub-band for which LBT is required before SRS transmission shown in the table) may be a sub-band included in set 1.

TABLE 9

| Indication value that SRS resources occupy the uplink LBT sub-band field | LBT sub-band occupied by SRS resources for LBT before SRS transmission |
| --- | --- |
| 00 | Uplink LBT sub-band set 1 configured by higher layer signaling |
| 01 | Uplink LBT sub-band set 2 configured by higher layer signaling |
| 10 | Uplink LBT sub-band set 3 configured by higher layer signaling |
| 11 | Uplink LBT sub-band set 4 configured by higher layer signaling |

It should be noted that in practical application, the embodiment of the present disclosure is not limited to the number of bytes occupied by the field indicating the uplink LBT sub-band required to perform LBT before SRS transmission, and the specific form of the value of the field, and Table 9 is only an optional example given for ease of understanding.

In an alternative embodiment of the present disclosure, the indication information in step S501 includes information for indicating an uplink LBT sub-band for transmitting PUSCH, and the step of determining an uplink LBT sub-band for transmitting SRS according to the indication information includes: determining the uplink LBT sub-band for transmitting PUSCH according to the information indicating the uplink LBT sub-band for transmitting PUSCH, and determining the uplink LBT sub-band for transmitting PUSCH as the uplink LBT sub-band for transmitting SRS.

Since it is also necessary to perform LBT on the uplink LBT sub-band occupied by PUSCH, that is, the uplink LBT sub-band for transmitting PUSCH, before transmitting PUSCH, when SRS is triggered by PDCCH scheduling PUSCH, the uplink LBT sub-band for transmitting PUSCH can be used as the uplink LBT sub-band for transmitting SRS.

As an example, it is assumed that the uplink LBT sub-band indicated in the PDCCH scheduling PUSCH for transmission of PUSCH is uplink LBT sub-band 1 and uplink LBT sub-band 2, and the PDCCH scheduling PUSCH drives aperiodic SRS transmission, the uplink LBT sub-band for transmission of the aperiodic SRS may be uplink LBT sub-band 1 and uplink LBT sub-band 2.

Figure 10:
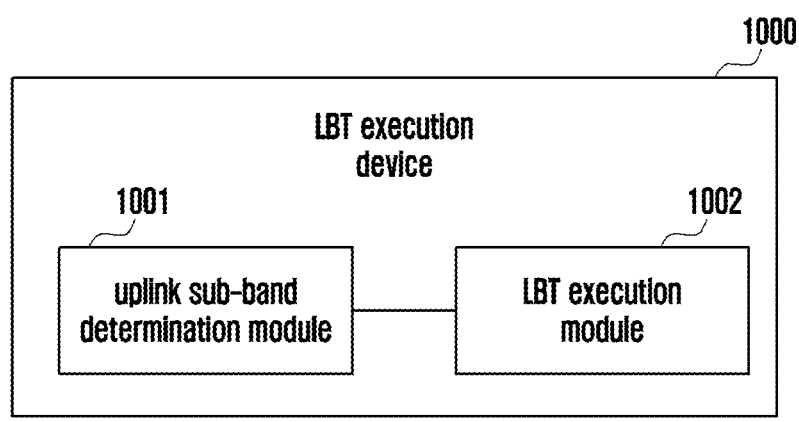
FIG. 10 shows a schematic structural diagram of an execution device of LBT according to an embodiment of the present disclosure.

Based on the same principle as the SRS transmission method provided in the embodiment of the present disclosure, the embodiment of the present disclosure also provides an LBT execution device. As shown in FIG. 10, the LBT execution device 1000 may include an uplink sub-band determination module 1001 and an LBT execution module 1002. Where: the uplink sub-band determination module 1001 is configured to acquire indication information and determine an uplink LBT sub-band for transmitting SRS according to the indication information; the LBT execution module 1002 is configured to perform LBT on the determined uplink LBT sub-band.

Alternatively, the apparatus may further include an SRS transmission module configured to transmit SRS according to the LBT result.

Alternatively, SRS is aperiodic SRS or periodic SRS.

Alternatively, SRS is aperiodic SRS triggered by SRS request field in PDCCH; and the indication information may include at least one of the following: downlink LBT sub-band where PDCCH is located, indication information carried in PDCCH, and downlink LBT sub-band in BWP.

Alternatively, PDCCH includes any of the following:
PDCCH for scheduling PDSCH;
PDCCH for scheduling PUSCH;
dedicated PDCCH for triggering aperiodic SRS;
if the PDCCH is PDCCH for scheduling PDSCH or dedicated PDCCH, the indication information carried in the PDCCH includes the value of the SRS request field and/or the value of the field indicating the uplink LBT sub-band for transmitting SRS;
if the PDCCH is PDCCH for scheduling PUSCH, the indication information carried in the PDCCH includes at least one of the following: value of the SRS request field; information indicating an uplink LBT sub-band for transmitting PUSCH; value of the field indicating the uplink LBT sub-band for transmitting SRS.

Alternatively, the indication information includes the values of the downlink LBT sub-band and the SRS request field where PDCCH is located, and the uplink sub-band determination module 1001 is specifically configured to: determine an uplink LBT sub-band for transmitting SRS according to the downlink LBT sub-band where PDCCH is located, the value of the SRS request field, and the first mapping relationship; the first mapping relationship is a mapping relationship between each downlink LBT sub-band, each value, and each uplink LBT sub-band.

Alternatively, the indication information includes the downlink LBT sub-band in BWP, and the uplink sub-band determination module 1001 is specifically configured to: determine an uplink LBT sub-band corresponding to an idle downlink LBT sub-band as an uplink LBT sub-band for transmitting SRS; or determine an uplink LBT sub-band corresponding to the downlink LBT sub-band satisfying a predetermined condition among idle downlink LBT sub-bands as an uplink LBT sub-band for transmitting SRS.

Alternatively, the downlink LBT sub-band satisfying the predetermined condition includes any of the following: M sub-bands in the idle downlink LBT sub-bands located at designated frequency domain locations, where M≥1.

Alternatively, M≥2, and the M sub-bands are M sub-bands with continuous frequency domain locations.

Alternatively, the indication information includes the values of the downlink LBT sub-band and SRS request field in BWP. The uplink sub-band determination module 1001 is specifically configured to: determine an uplink LBT sub-band for transmitting SRS according to the idle downlink LBT sub-band, the value of the SRS request field, and the second mapping relationship; where the second mapping relationship is a mapping relationship between each downlink LBT sub-band, each value, and each uplink LBT sub-band.

Alternatively, the indication information includes the downlink LBT sub-band in BWP and the downlink LBT sub-band where PDCCH is located and the uplink sub-band determination module 1001 is specifically configured to: determine the uplink LBT sub-band corresponding to the downlink LBT sub-band in which PDCCH is located in the idle downlink LBT sub-band and/or the uplink LBT sub-band corresponding to the downlink LBT sub-band in which PDCCH is located in the idle downlink LBT sub-band satisfying a specific frequency domain location relationship as the uplink LBT sub-band for transmitting SRS.

Alternatively, the indication information includes a value of a field for indicating an uplink LBT sub-band for transmitting SRS, and the uplink sub-band determination module 1001 is specifically configured to: determine the uplink LBT sub-band for transmitting SRS according to the value of a field indicating an uplink LBT sub-band for transmitting SRS and a third mapping relationship; where the third mapping relationship is the mapping relationship between each value and each uplink LBT sub-band.

Alternatively, the indication information includes information for indicating an uplink LBT sub-band for transmitting PUSCH and the uplink sub-band determination module 1001 is specifically configured to: determine the uplink LBT sub-band for transmitting PUSCH according to the information indicating the uplink LBT sub-band for transmitting PUSCH, and determining the uplink LBT sub-band for transmitting PUSCH as the uplink LBT sub-band for transmitting SRS.

Alternatively, the SRS transmission module 130 is specifically configured to: transmit SRS if the LBT result is idle; transmit no SRS if the LBT result is not idle.

Embodiment 3

Figure 11:
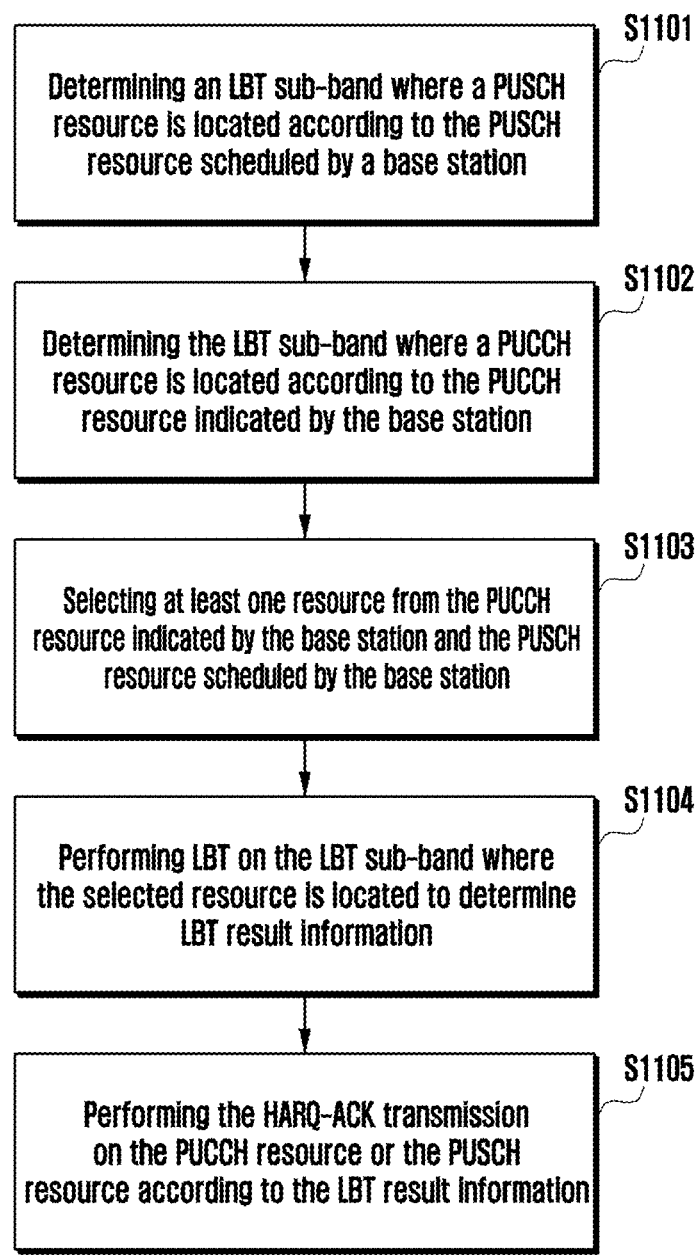
FIG. 11 is a schematic flowchart of another method for transmitting HARQ-ACK according to an embodiment of the present application.

An embodiment of the present application provides another method for transmitting HARQ-ACK, which is applied to a UE. A schematic flowchart of the method is shown in FIG. 11. The method includes:

Step S1101: determining an LBT sub-band where a PUSCH resource is located according to the PUSCH resource scheduled by a base station.

Step S1102: determining the LBT sub-band where a PUCCH resource is located according to the PUCCH resource indicated by the base station.

Step S1103: selecting at least one resource from the PUCCH resource indicated by the base station and the PUSCH resource scheduled by the base station.

Step S1104: performing LBT on the LBT sub-band where the selected resource is located to determine LBT result information.

Step S1105: performing the HARQ-ACK transmission on the PUCCH resource or the PUSCH resource according to the LBT result information.

In the embodiment of the present application, determining an LBT sub-band where a PUSCH resource is located according to the PUSCH resource scheduled by a base station; determining the LBT sub-band where a PUCCH resource is located according to the PUCCH resource indicated by the base station; selecting at least one resource from the PUCCH resource indicated by the base station and the PUSCH resource scheduled by the base station; performing LBT on the LBT sub-band where the selected resource is located to determine LBT result information; performing the HARQ-ACK transmission on the PUCCH resource or the PUSCH resource according to the LBT result information. In this way, the HARQ-ACK is transmitted in an unlicensed frequency band.

Optionally, when the PUCCH resource and the PUSCH resource are selected from PUCCH resources indicated by the base station and PUSCH resources scheduled by the base station, the performing LBT on the LBT sub-band where the selected resource is located to determine LBT result information, comprising:

performing the LBT on the LBT sub-band where the PUSCH resource is located and the LBT sub-band where the PUCCH resource is located, to obtain the LBT result information.

Optionally, the performing the HARQ-ACK transmission on the PUCCH resource or the PUSCH resource according to the LBT result information, comprising:

when the LBT result information is that transmitting the PUSCH is allowed, transmitting the PUSCH on an idle uplink LBT sub-band where the PUSCH resource is located, and performing the HARQ-ACK transmission on the PUSCH resource;

when the LBT result information is that transmitting the PUSCH is not allowed and transmitting the PUCCH is allowed, performing the HARQ-ACK transmission on the PUCCH resource of an idle uplink LBT sub-band where the PUCCH resource is located;

when the LBT result information is that transmitting the PUSCH is not allowed and transmitting the PUCCH is not allowed, no HARQ-ACK transmission is performed.

Optionally, when the PUSCH resource is selected from the PUCCH resource indicated by the base station and the PUSCH resource scheduled by the base station, performing the HARQ-ACK transmission on the PUSCH resource according to the LBT result information, comprising:

when the LBT result information is that transmitting the PUSCH is allowed, the PUSCH is transmitted on an idle uplink LBT sub-band where the PUSCH resource is located, and the HARQ-ACK transmission is performed on the PUSCH resource;

when the LBT result information is that transmitting the PUSCH is not allowed, no HARQ-ACK transmission is performed.

Optionally, when the PUCCH resource is selected from the PUCCH resource indicated by the base station and the PUSCH resource scheduled by the base station, performing the HARQ-ACK transmission on the PUCCH resource according to the LBT result information, comprising:

when the LBT result information is that transmitting the PUSCH is allowed, the PUCCH is transmitted on an idle uplink LBT sub-band where the PUCCH resource is located, and the HARQ-ACK transmission is performed on the PUCCH resource;

when the LBT result information is that transmitting the PUCCH is not allowed, no HARQ-ACK transmission is performed.

Optionally, the performing the HARQ-ACK transmission on the PUCCH resource or the PUSCH resource according to the LBT result information, comprising:

when a serving cell with the smallest cell index number in the scheduled PUSCH is allowed to transmit the PUSCH, according to the LBT result, the PUSCH is transmitted on an idle uplink LBT sub-bands of all serving cells, and the HARQ-ACK transmission is performed on the PUSCH resources of the serving cell with the smallest cell index number; or when the serving cell with the smallest cell index number in the scheduled PUSCH is not allowed to transmit the PUSCH and transmitting the PUCCH is allowed according to the LBT result, the HARQ-ACK transmission is performed on the PUCCH resource of the uplink LBT sub-band whose LBT result is idle, and transmitting the PUSCH is not allowed on the PUSCH resources of other serving cells except the serving cell with the smallest cell index number; or when the serving cell with the smallest cell index number in the scheduled PUSCH is not allowed to transmit the PUSCH and transmitting the PUCCH is allowed according to the LBT result, the HARQ-ACK transmission is performed on the PUCCH resource of the uplink LBT sub-band whose LBT result is idle, and the PUSCH of the other serving cells except the serving cell with the smallest cell index number determines whether to perform the PUSCH transmission according to the LBT result of the other serving cells;

the PUSCH of the other serving cells determines whether to perform the PUSCH transmission according to the LBT result of the other serving cell, comprising:

when the LBT result is a PUSCH of a serving cell of an idle PUSCH, the PUSCH transmission is performed on the serving cell of the idle PUSCH;

when the LBT result is a PUSCH of a serving cell of a busy PUSCH, no PUSCH transmission is performed on the serving cell of the busy PUSCH.

Optionally, PUCCH and PUSCH may belong to one serving cell, or may belong to different serving cells. There are several processing methods below.

It should be noted that the LBT result is the LBT result information.

Method 1:

If within a time unit, the base station schedules the PUSCH transmission to the UE while instructing to use the PUCCH to transmit HARQ-ACK at this time unit, the UE performs the LBT on the LBT sub-band which is determined to perform LBT according to the scheduled PUSCH resources and the LBT sub-band which is determined to perform LBT according to the indicated PUCCH resource. If the PUSCH can be transmitted according to the LBT result, the PUSCH is transmitted on the idle uplink LBT sub-band, and the HARQ-ACK is transmitted in the PUSCH. If the PUSCH cannot be transmitted according to the LBT result, and if the PUCCH can be transmitted according to the LBT result, the HARQ-ACK transmission is performed on the PUCCH resource of the uplink LBT sub-band whose LBT result is idle.

Figure 12:
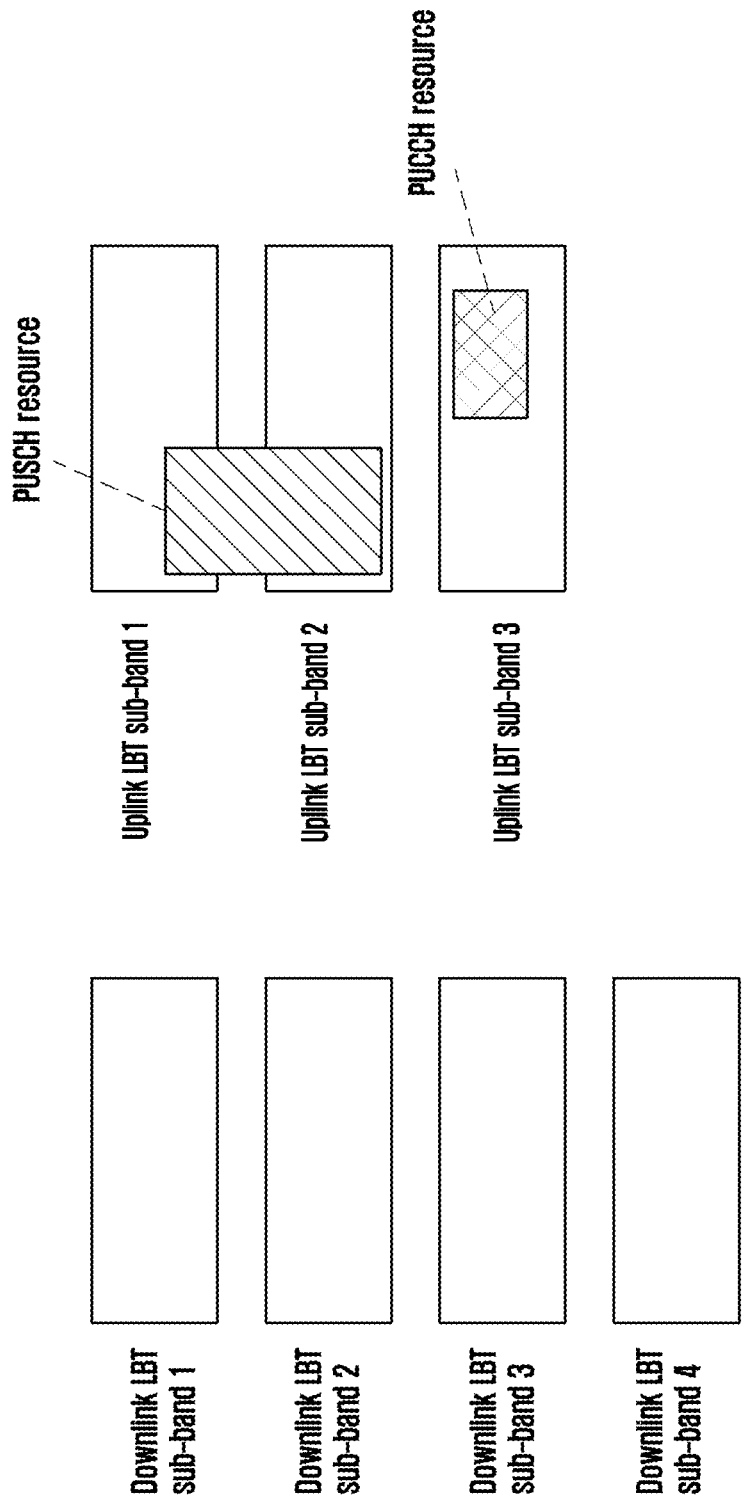
FIG. 12 is a schematic diagram of performing HARQ-ACK transmission on a PUSCH resource or a PUCCH resource according to an embodiment of the present application.
Figure 13:
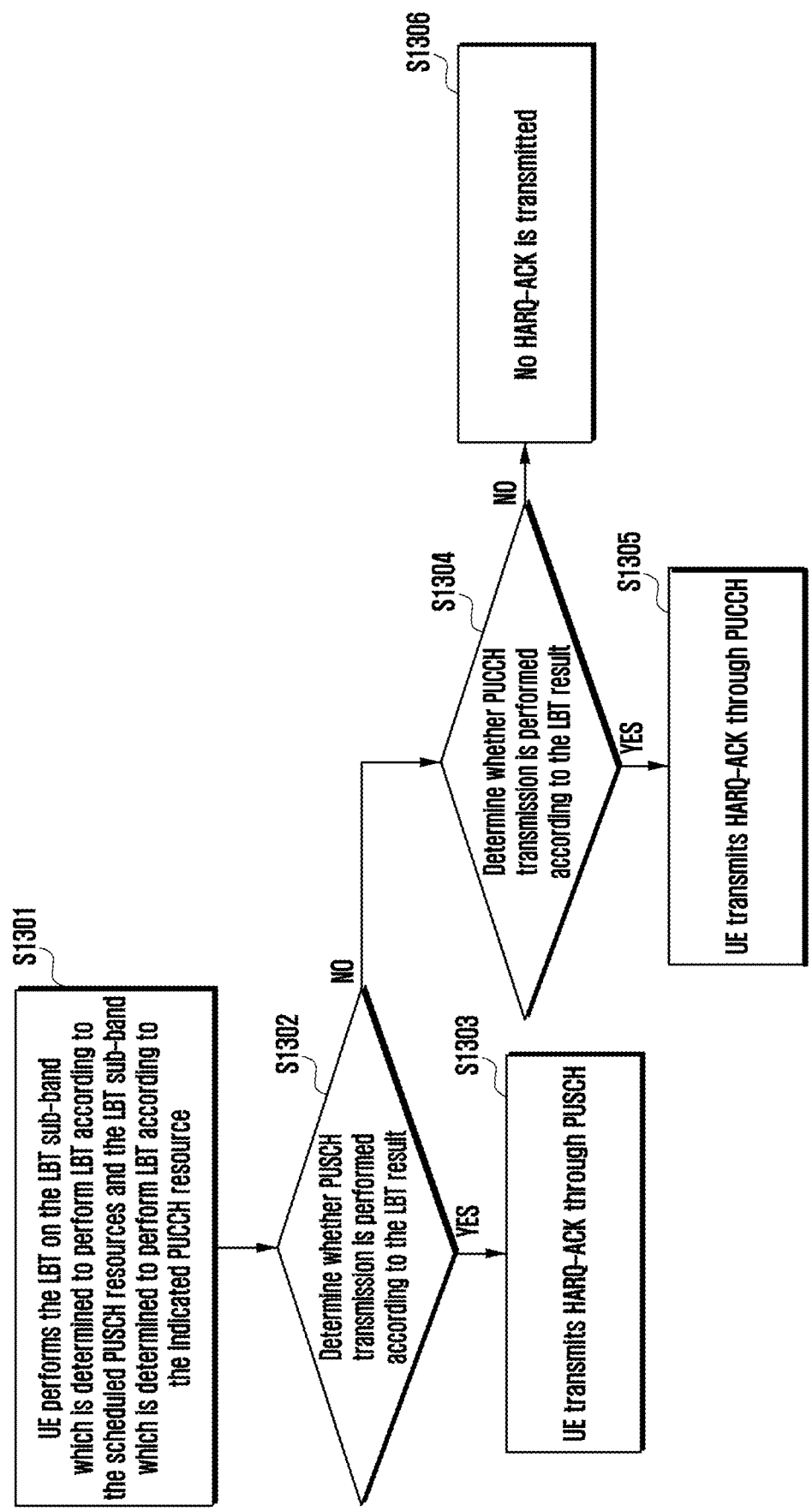
FIG. 13 is a schematic flowchart of performing HARQ-ACK transmission on a PUSCH resource or a PUCCH resource according to an embodiment of the present application.

Optionally, the LBT sub-band which is determined to perform LBT according to the scheduled PUSCH resources is uplink LBT sub-band 1 and the uplink LBT sub-band 2, and the LBT sub-band which is determined to perform LBT according to the indicated PUCCH resource is the uplink LBT sub-band 3, as shown in FIG. 12. At this time, the UE needs to perform LBT on the uplink LBT sub-band 1, the uplink LBT sub-band 2, and the uplink LBT sub-band 3. If the LBT results of the uplink LBT sub-band 1 and the uplink LBT sub-band 2 are idle, according to the LBT results, PUSCH can be transmitted, PUSCH is transmitted on the uplink LBT sub-band 1 and the uplink LBT sub-band 2, and HARQ-ACK transmission is performed on PUSCH. If the LBT results of the uplink LBT sub-band 1 and the uplink LBT sub-band 2 are both busy, and the LBT result of the uplink LBT sub-band 3 is idle, the HARQ-ACK transmission is performed on the PUCCH resource of the uplink LBT sub-band 3 whose LBT result is idle. The specific process is shown in FIG. 13. The method includes:

Step S1301: UE performs the LBT on the LBT sub-band which is determined to perform LBT according to the scheduled PUSCH resources and the LBT sub-band which is determined to perform LBT according to the indicated PUCCH resource.

Step S1302: determine whether PUSCH transmission can be performed according to the LBT result; if it is YES, the process proceeds to step S1303; if it is NO, the process proceeds to step S1304.

Step S1303: UE transmits HARQ-ACK through PUSCH.

Step S1304: determine whether PUCCH transmission can be performed according to the LBT result; when it is YES, the process proceeds to step S1305; when it is NO, the process proceeds to step S1306.

Step S1305: UE transmits HARQ-ACK through PUCCH.

Step S1306: no HARQ-ACK transmission is performed.

Since LBT is performed on the LBT sub-band where the PUSCH is located, LBT is also performed on the LBT sub-band where the PUCCH is located, and the HARQ-ACK transmission is performed on the PUSCH or the PUCCH according to the LBT result. The chance of HARQ-ACK transmission can be increased by using this method.

Method 2:

If within a time unit, the base station schedules the PUSCH transmission to the UE while instructing to use the PUCCH to transmit HARQ-ACK at this time unit, the UE performs LBT on the LBT sub-band which is determined to perform LBT according to the scheduled PUSCH resources. If the PUSCH can be transmitted according to the LBT result, the PUSCH transmission is performed on the idle uplink LBT sub-band, and the HARQ-ACK transmission is performed on the PUSCH. If the PUSCH cannot be transmitted according to the LBT result, the HARQ-ACK transmission is not performed.

Figure 14:
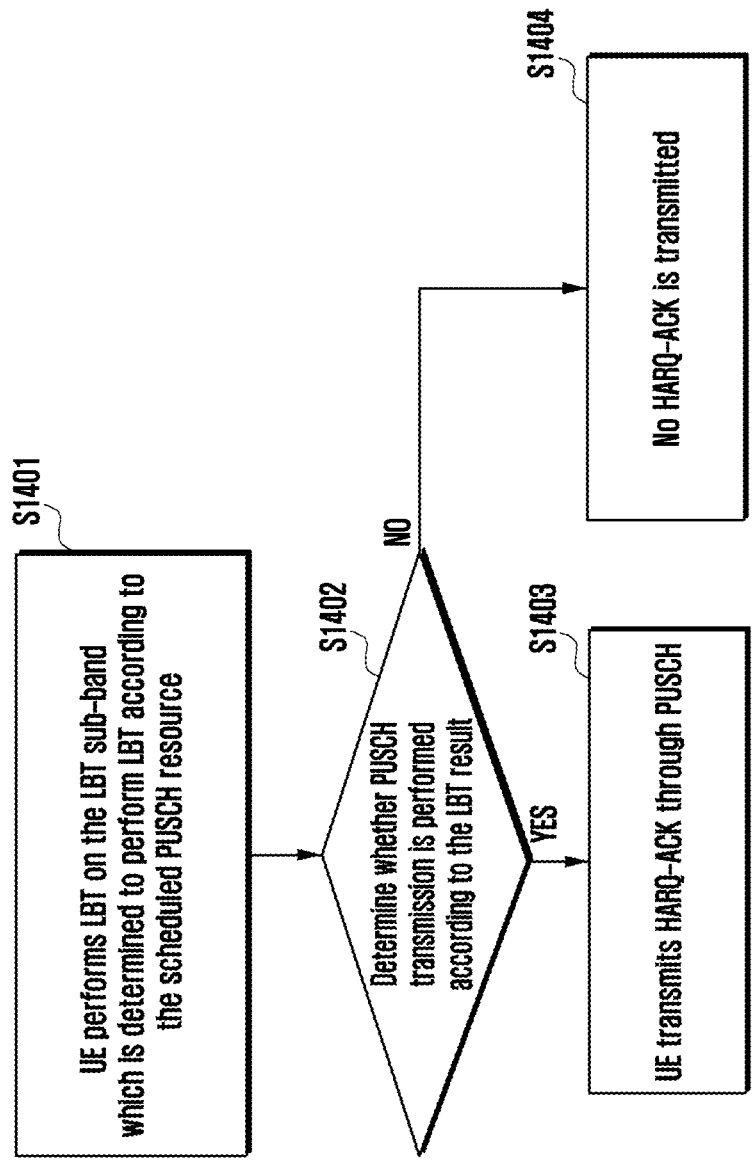
FIG. 14 is a schematic diagram of HARQ-ACK transmission on a PUSCH resource according to an embodiment of the present application.

Optionally, the LBT sub-band which is determined to perform LBT according to the scheduled PUSCH resources is the uplink LBT sub-band 1 and the uplink LBT sub-band 2, and the LBT sub-band which is determined to perform LBT according to the indicated PUCCH resource is the uplink LBT sub-band 3. As shown in FIG. 12, at this time, the UE needs to perform LBT on the uplink LBT sub-band 1 and uplink LBT sub-band 2. If the LBT results of the uplink LBT sub-band 1 and the uplink LBT sub-band 2 both are idle, PUSCH can be transmitted according to the LBT results, PUSCH is transmitted on the uplink LBT sub-band 1 and the uplink LBT sub-band 2 and HARQ-ACK transmission is performed on the PUSCH. If the LBT results of the uplink LBT sub-band 1 and the uplink LBT sub-band 2 are both busy, the HARQ-ACK transmission is not performed. The specific process is shown in FIG. 14. The method includes:

Step S1401: UE performs LBT on the LBT sub-band which is determined to perform LBT according to the scheduled PUSCH resource.

Step S1402: determine whether PUSCH transmission can be performed according to the LBT result; when it is YES, the process proceeds to step S1403; when it is NO, the process proceeds to step S1404.

Step S1403: UE transmits HARQ-ACK through PUSCH.

Step S1404: no HARQ-ACK is transmitted.

Since LBT is performed only on the LBT sub-band where the PUSCH is located, not on the LBT sub-band where the PUCCH is located, this method can reduce the implementation complexity of LBT.

Method 3:

If within a time unit, the base station schedules the PUSCH transmission for the UE while instructing to use the PUCCH to transmit HARQ-ACK at the same time unit, the UE performs LBT on the LBT sub-band which is determined to perform LBT according to the indicated PUCCH resources. If the PUCCH can be transmitted according to the LBT result, the PUCCH is transmitted on the idle uplink LBT sub-band and the HARQ-ACK is transmitted in the PUCCH. If the PUCCH cannot be transmitted according to the LBT result, the HARQ-ACK is not transmitted. This method can increase the chance of HARQ-ACK transmission.

Method 4:

If within one time unit, the base station schedules at least one PUSCH transmission for UEs in different serving cells (for example, the number of scheduled PUSCHs is M, and M is greater than or equal to 1), and at the same time, it is indicated that at least one PUCCH is used to transmit HARQ-ACK (for example, the indicated number of PUCCH is N, N is greater than or equal to 1), the UE selects P PUSCH resources from M (P is greater than or equal to 0 and less than or equal to M) PUSCH resources, and the UE selects Q PUCCH resources from N (Q is greater than or equal to 0 and less than or equal to N) PUCCH resources. For example, the determination method of P and Q is that P+Q is less than or equal to L (L is determined by the high-layer signaling configuration). The UE performs the LBT on the LBT sub-band which is determined to perform LBT according to the selected PUSCH resources and on the LBT sub-band which is determined according to the selected PUCCH resources. If the PUSCH can be transmitted according to the LBT result, the PUSCH is transmitted on the idle uplink LBT sub-band, and the HARQ-ACK is transmitted on the PUSCH. If the PUSCH cannot be transmitted according to the LBT result, and the PUCCH can be transmitted according to the LBT result, HARQ-ACK is transmitted on the PUCCH resource of the uplink LBT sub-band whose LBT result is idle. By using this method, the requirements of the HARQ-ACK transmission can be met, and on the premise of meeting the requirements of the HARQ-ACK transmission, the implementation complexity of LBT can be reduced as much as possible.

Method 5:

If within one time unit, the base station schedules at least one PUSCH transmission for UEs in different serving cells (for example, the number of scheduled PUSCHs is M, and M is greater than or equal to 1), and at the same time, it is indicated that at least one PUCCH is used to transmit HARQ-ACK (for example, the indicated number of PUCCH is N, N is greater than or equal to 1), the UE selects one (this PUSCH may be the PUSCH of the serving cell with the smallest cell index in the scheduled PUSCH, for example, the PUSCH of the serving cell with index x, where x is a positive integer) PUSCH resource from M PUSCH resources as the PUSCH for transmitting HARQ-ACK, and the UE selects Q (Q is greater than or equal to 0 and less than or equal to N) PUCCH resources from N PUCCH resources. The UE performs LBT on the LBT sub-band of the scheduled M PUSCH resources and the LBT sub-band of the selected Q PUCCH resources. If, according to the LBT result, the serving cell with the index x can transmit the PUSCH, the PUSCH is transmitted on the idle uplink LBT sub-bands of all the serving cells, and the HARQ-ACK is transmitted on the PUSCH of the serving cell with the index x. If the PUSCH cannot be transmitted in the serving cell with the index x according to the LBT result, and if the PUCCH can be transmitted according to the LBT result, the HARQ-ACK is transmitted on the PUCCH resource of the uplink LBT sub-band whose LBT result is idle, not on the PUSCH of other serving cells. Or, if the PUSCH cannot be transmitted in the serving cell with the index x according to the LBT result, and if the PUCCH can be transmitted according to the LBT result, HARQ-ACK is transmitted on the PUCCH resource of the uplink LBT sub-band whose LBT result is idle, and whether the HARQ-ACK is transmitted on the PUSCH of other serving cells is determined based on the LBT results of other serving cells, that is, the PUSCH whose LBT result is idle can be used to transmit, and the PUSCH whose LBT result is busy cannot be used to transmit. In this case, the PUCCH and PUSCH may be used to transmit at the same time. By using this method, the requirements of the HARQ-ACK transmission can be met, and on the premise of meeting the requirements of the HARQ-ACK transmission, the implementation complexity of LBT can be reduced as much as possible.

Embodiment 4

Figure 19:
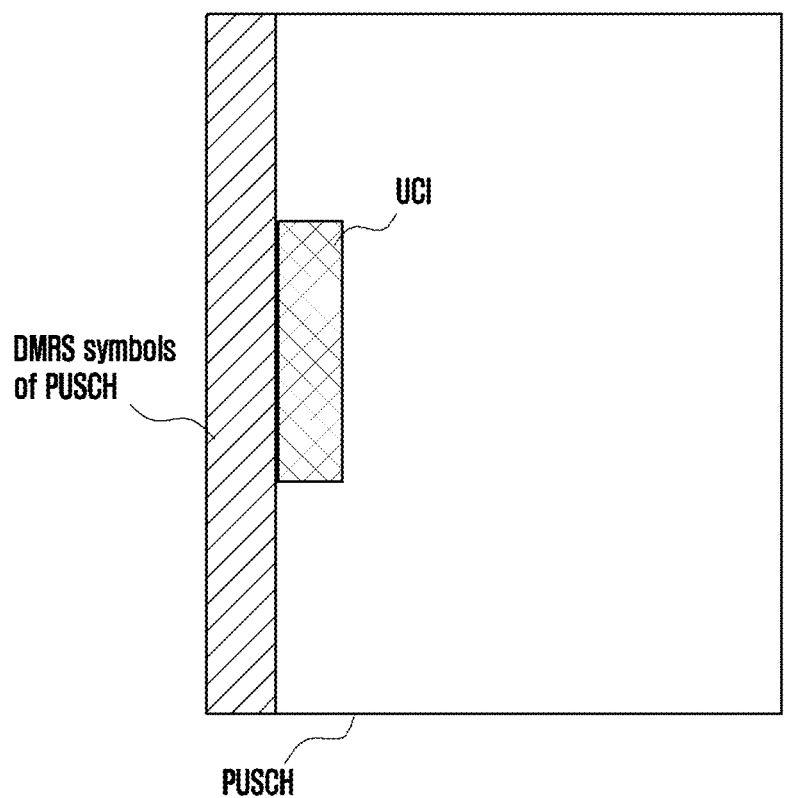
FIG. 19 shows a schematic diagram of resources occupied by DMRS and UCI in the PUSCH in an example of the disclosure.

UCI can be transmitted in PUSCH, that is, UCI can be multiplexed in PUSCH, that is, multiplexed on resources after PUSCH DMRS. As shown in FIG. 19, the horizontal axis in the figure represents the time domain resources of PUSCH, and the vertical axis represents the frequency domain resources of PUSCH. UCI can use the resources after the resources used for transmitting DMRS in PUSCH (i.e., DMRS symbols of PUSCH shown in the figure), while DMRS transmitted in PUSCH at this time are used for demodulation of PUSCH (i.e., demodulation of data transmitted in PUSCH) and also for demodulation of UCI.

However, in actual application scenarios, in some cases, UCI is multiplexed on resources far away from the PUSCH DMRS instead of being multiplexed on the resources close to the PUSCH DMRS (i.e., DMRS for demodulating PUSCH). At this time, if UCI shares the PUSCH DMRS, UCI may have poor demodulation performance. In order to ensure the demodulation performance of UCI, the embodiment of the present disclosure also provides a transmission method of UCI, which may include the following steps.

Step S1: determining DMRS for demodulating UCI transmitted in PUSCH;

Step S2: transmitting UCI or indication information of the UCI in PUSCH based on the determined DMRS for demodulating UCI.

The indication information of the UCI refers to the indication information used to indicate what kind of uplink control information the UCI information transmitted by the UE is. Upon receiving the indication information of the UCI, the base station can determine the specific information of the uplink control information transmitted by the UE based on the indication information. The specific form of the indication information is not limited in the embodiment of the present disclosure. For example, it may be information carried by bits of a specified length (e.g., 2 bits), e.g., 00, 01, 10, and 11 respectively correspond to four different UCI. Upon receiving the indication information, the base station can determine the corresponding UCI based on which of the four types of 00, 01, 10, and 11 the received indication information is.

According to the scheme provided by the embodiment of the present disclosure, when UCI needs to be transmitted in PUSCH, UE can first determine DMRS for demodulating UCI, and transmit UCI based on the determined DMRS, wherein the DMRS for demodulating UCI is a dedicated DMRS or the same DMRS as the DMRS for demodulating PUSCH, and by adopting the scheme, demodulation performance of UCI can be effectively ensured.

The UCI may specifically include at least one item of information in the UCI that needs to be transmitted in PUSCH, such as at least one item of hybrid automatic repeat request Response (HARQ-ACK, Hybrid Automatic Re-Transmission Request-Acknowledgement), Scheduling Request (SR, Scheduling Request), and Channel State Information (CSI).

In an alternative embodiment of the present disclosure, the step of determining DMRS for demodulating UCI transmitted in PUSCH includes at least one of the following: determining the DMRS used for demodulating UCI as a dedicated DMRS; if the location interval between the first resource location occupied by UCI in PUSCH and the second resource location occupied by DMRS for demodulating PUSCH in PUSCH is less than the set interval, the DMRS for demodulating UCI and the DMRS for demodulating PUSCH are the same DMRS, and if the location interval between the first resource location and the second resource location is not less than the set interval, the DMRS for demodulating UCI is a dedicated DMRS.

Where the location interval between the first resource location and the second resource location is smaller than the set interval, which means that the number of OFDM (Orthogonal Frequency Division Multiplexing) symbols spaced between the first resource location and the second resource location in the time domain is smaller than the set value.

That is to say, for UCI transmitted in PUSCH, one way to demodulate DMRS of UCI is to directly use dedicated DMRS, that is, DMRS dedicated to demodulate UCI. Another method may be to determine whether the DMRS for demodulating UCI adopts a dedicated DMRS based on the location interval between the first resource location occupied by UCI in PUSCH and the second resource location occupied by DMRS for demodulating PUSCH in PUSCH. Specifically, when the location interval between the first resource location and the second resource location is small, the DMRS for demodulating UCI and the DMRS for demodulating PUSCH can be the same DMRS, i.e. the existing DMRS used for UCI transmission in PUSCH can be adopted. At this time, since the locations of UCI and DMRS are relatively close, the demodulation performance of UCI can be better ensured. However, when the location interval between a resource location and a second resource location is large, UCI's dedicated DMRS can be used to ensure the demodulation performance of UCI.

The relationship between the resource location occupied by the dedicated DMRS in PUSCH and the resource location occupied by the UCI in PUSCH may be predetermined by the base station and the UE, may be determined by the UE according to the indication information obtained from the base station, or may be determined by the UE according to the determination method based on the determination method predetermined by the base station and the UE.

In an alternative embodiment of the present disclosure, the step of transmitting UCI or indication information of the UCI in PUSCH based on the determined DMRS for demodulating UCI may include at least one of the following: transmitting a dedicated DMRS and UCI in PUSCH in a time division multiplexing manner when the DMRS used for demodulating UCI is the dedicated DMRS; transmitting a dedicated DMRS and UCI in PUSCH in a frequency division multiplexing manner when the DMRS used for demodulating UCI is the dedicated DMRS; transmitting indication information of UCI in PUSCH when the DMRS used for demodulating UCI is a dedicated DMRS.

The specific transmission method to be adopted can be agreed upon in advance by the base station and the UE, i.e. agreed upon in the protocols.

In order to better understand the UCI transmission method provided by the embodiment of the disclosure, the method will be further explained below with several examples.

Example 1

Figure 20:
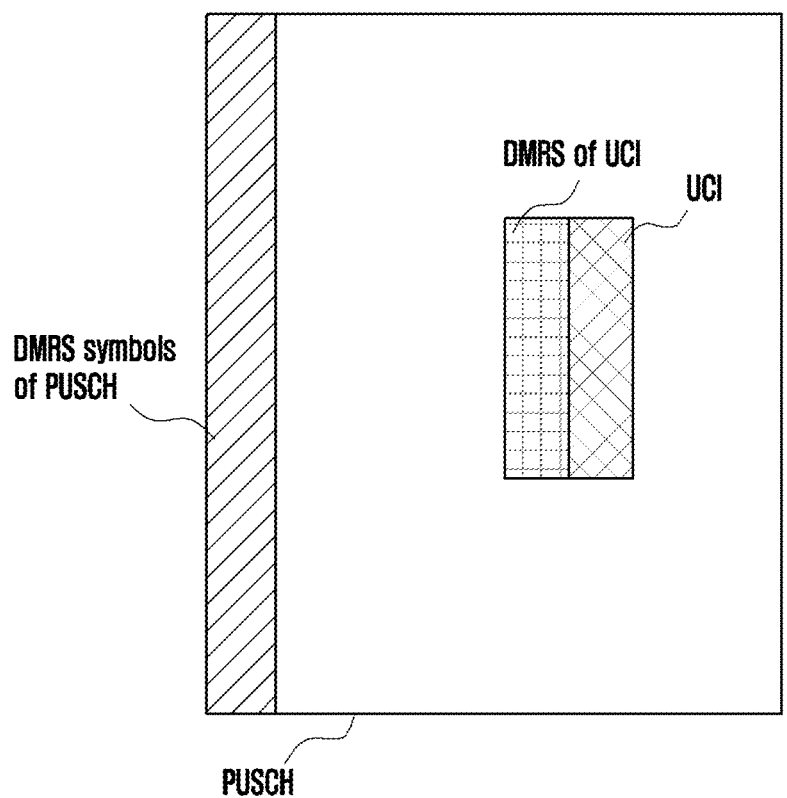
FIG. 20 shows a schematic diagram of resources occupied by DMRS and UCI in the PUSCH in another example of the disclosure.

In order to improve the performance of UCI, it may be far away between the resources multiplexing UCI (i.e., the resources used for UCI transmission in PUSCH, i.e., the resources in PUSCH occupied by UCI) and PUSCH DMRS (i.e., DMRS capable of demodulating the data transmitted in PUSCH). That is, the location interval between the first resource location occupied by UCI in PUSCH and the second resource location occupied by DMRS for demodulating PUSCH in PUSCH is smaller than the set interval. For example, when the resources multiplexing UCI and PUSCH DMRS are separated by L OFDM symbols, L is a positive integer greater than or equal to 1, and can be configured by high layer signaling or preset by protocols, a dedicated DMRS can be added to demodulate UCI, and this dedicated DMRS is a DMRS different from PUSCH DMRS. As shown in FIG. 20, the DMRS symbol of PUSCH shown in the figure is the resource location occupied by the PUSCH DMRS, the DMRS of UCI is the dedicated DMRS for demodulating UCI, and the resource locations corresponding to the DMRS of UCI and UCI in the figure, i.e. the resources occupied by the dedicated DMRS and UCI respectively, and the dedicated DMRS are configured for UCI, so that the demodulation performance of UCI can be improved.

Example 2

Figure 21:
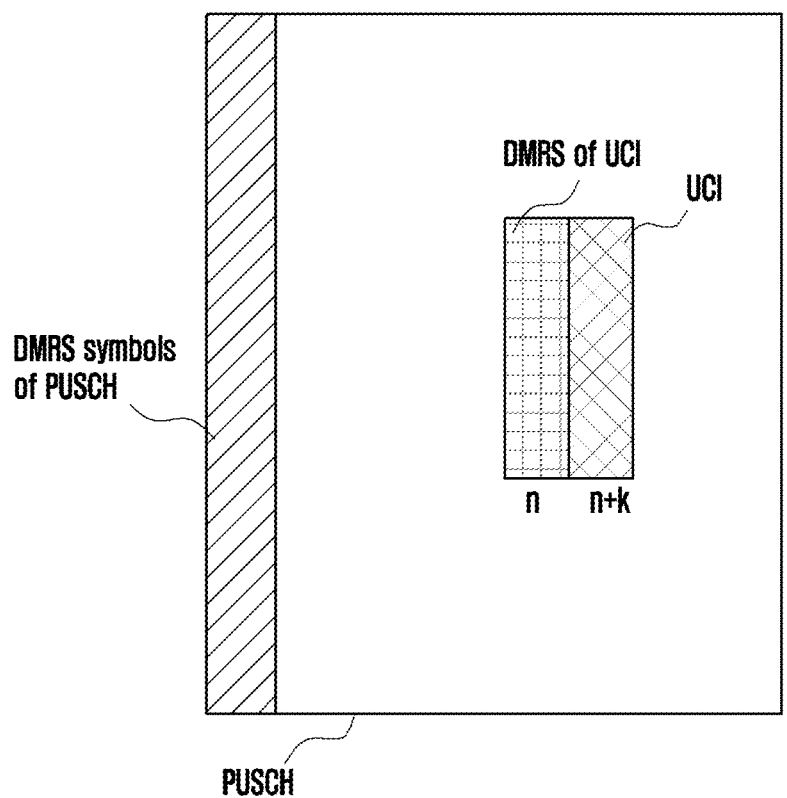
FIG. 21 shows a schematic diagram of resources occupied by DMRS and UCI in the PUSCH in yet another example of the disclosure.

As an alternative, UCI and DMRS used to demodulate UCI (i.e., dedicated DMRS) can be time division multiplexed, i.e., UCI and DMRS used to demodulate UCI are located in different OFDM symbols. For example, DMRS used to demodulate UCI is located in OFDM symbol N (nth OFDM symbol of PUSCH resource), UCI is located in OFDM symbol n+k, K is a positive integer greater than or equal to 1, and UCI and DMRS used for demodulating UCI occupy the same frequency domain resources. As shown in FIG. 21, DMRS of UCI occupies the nth OFDM symbol, UCI occupies the (n+k)th OFDM symbol, and k=1 in this example of FIG. 21.

Example 3

Figure 22:
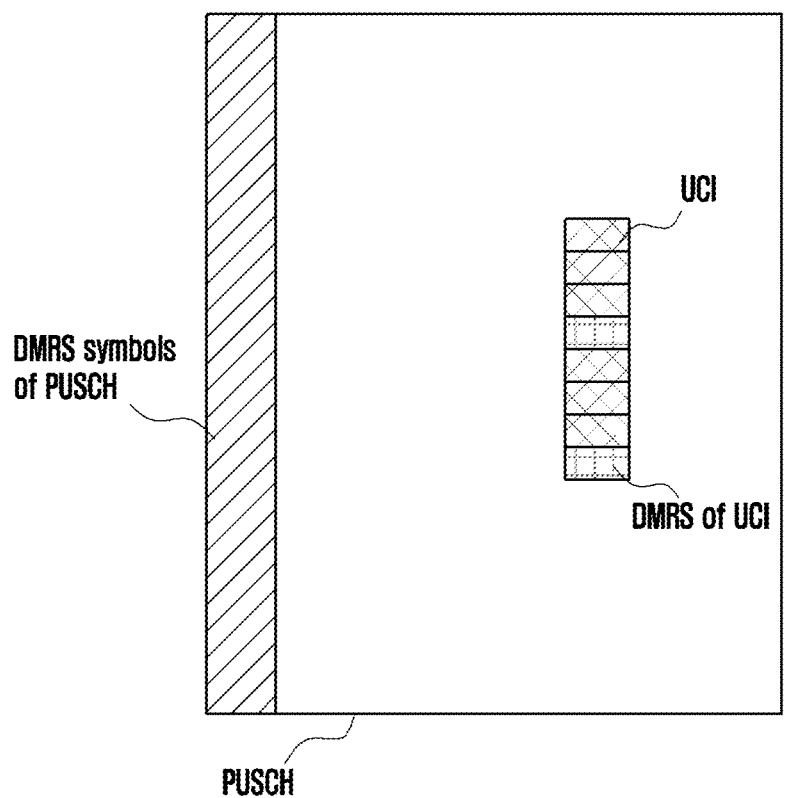
FIG. 22 shows a schematic diagram of resources occupied by DMRS and UCI in the PUSCH in yet another example of the disclosure.

As an alternative, UCI and DMRS used to demodulate UCI can be frequency division multiplexed, that is, UCI and DMRS used to demodulate UCI are located in the same OFDM symbol, the multiplexed UCI and DMRS used to demodulate UCI are spaced apart. For example, DMRS RE for demodulating UCI is placed every m UCI resource elements, m is a positive integer greater than or equal to 1 (e.g., m is equal to 3), m can be configured by higher layer signaling or preset by a protocol. As shown in the example of FIG. 22, on the same OFDM symbol, adjacent two REs for transmitting DMRS for demodulating UCI are separated by 3 REs for transmitting UCI.

Example 4

Figure 23:
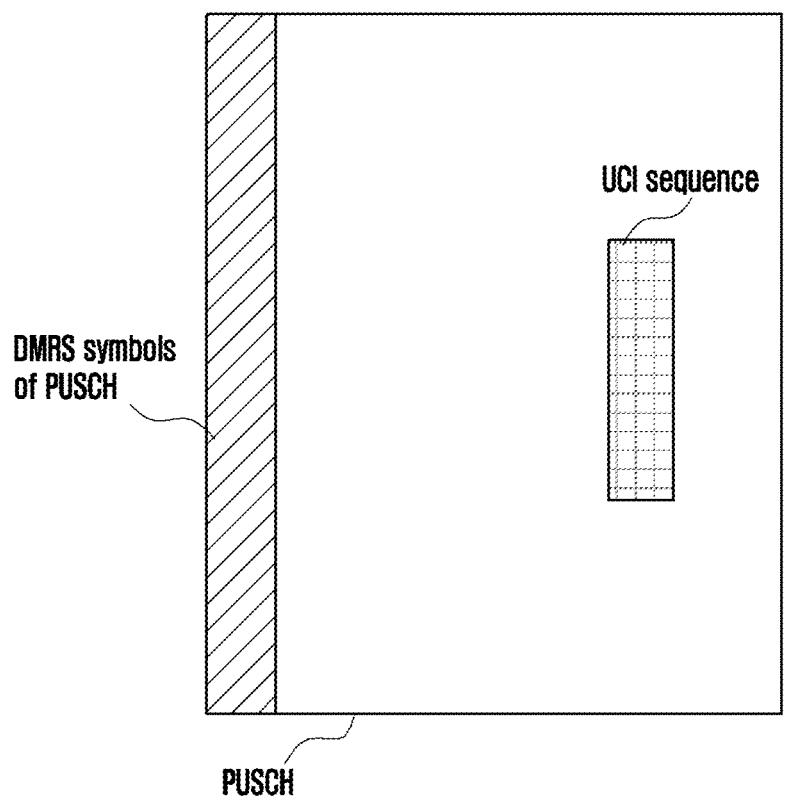
FIG. 23 shows a schematic diagram of resources occupied by indication information of UCI in the PUSCH in an example of the disclosure.

As an alternative, UCI can be multiplexed in PUSCH in sequence, that is, a reference signal (indication information corresponding to UCI in the previous text) can be multiplexed in PUSCH, and the sequence of the reference signal includes UCI information. As shown in FIG. 23, the UCI sequence shown in the figure is the indication information of UCI. In this scheme, the UE may not transmit dedicated DMRS and UCI, but only need to transmit the indication information of corresponding UCI to the base station.

The UCI transmission method provided by the embodiment of the disclosure can have the following beneficial effects:
1. for UCI, the above method can ensure accurate channel estimation through dedicated DMRS, thus ensuring demodulation performance of UCI.
2. the above method can reduce the impact on PUSCH performance when PUSCH is used to transmit UCI due to the distance between UCI and PUSCH DMRS and the loss of PUSCH when the demodulation performance of UCI is not guaranteed.
3. a good balance can be achieved between the effective utilization of resources and the demodulation performance of UCI, that is, when the locations of DRMS and UCI used to demodulate PUSCH are close, the data transmitted in PUSCH and UCI can share the same DRMS to reduce the resources occupied by DRMS. If the two locations are far away, a dedicated DRSM can be adopted for UCI to ensure the demodulation performance of UCI.

Based on the same principle as the UCI transmission method provided by the embodiment of the present disclosure, the embodiment of the present disclosure also provides a UCI transmission device, which may include at least one processor configured to: determine DMRS for demodulating UCI transmitted in PUSCH; transmit the UCI in PUSCH based on the determined DMRS for demodulating the UCI.

Alternatively, the at least one processor is configured to perform at least one of the following when determining DMRS for demodulating UCI transmitted in PUSCH: determining the DMRS used for demodulating UCI as a dedicated DMRS; if the location interval between the first resource location occupied by UCI in PUSCH and the second resource location occupied by DMRS for demodulating PUSCH in PUSCH is less than the set interval, the DMRS for demodulating UCI and the DMRS for demodulating PUSCH are the same DMRS, and if the location interval between the first resource location and the second resource location is not less than the set interval, the DMRS for demodulating UCI is a dedicated DMRS.

Alternatively, the location interval between the first resource location and the second resource location is smaller than the set interval, which means that the number of orthogonal frequency division multiplexing OFDM symbols separated in time domain between the first resource location and the second resource location is smaller than the set value.

Alternatively, the at least one processor is configured to perform at least one of the following when transmitting the UCI in PUSCH based on the determined DMRS for demodulating the UCI: transmitting a dedicated DMRS and UCI in PUSCH in a time division multiplexing manner when the DMRS used for demodulating UCI is the dedicated DMRS; transmitting a dedicated DMRS and UCI in PUSCH in a frequency division multiplexing manner when the DMRS used for demodulating UCI is the dedicated DMRS; transmitting indication information of UCI in PUSCH when the DMRS used for demodulating UCI is a dedicated DMRS.

Figure 15:
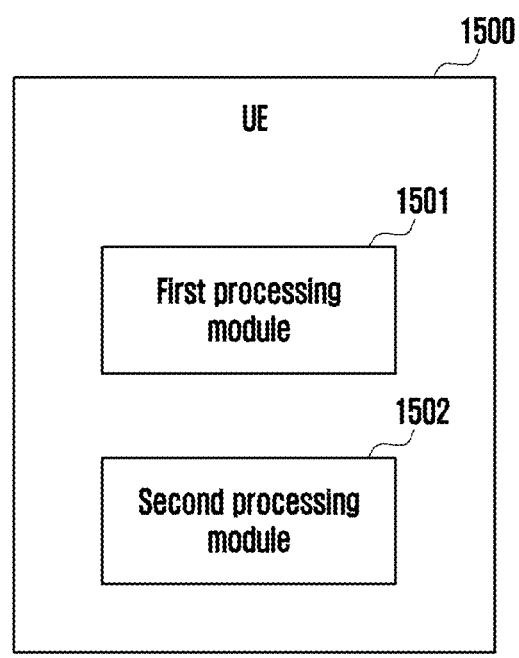
FIG. 15 is a schematic structural diagram of a UE according to an embodiment of the present application.

Based on the same inventive concept of the embodiment 1, an embodiment of the present application further provides an user equipment (UE). A schematic structural diagram of the UE is shown in FIG. 15. The UE 1500 includes a first processing module 1501 and a second processing module 1502.

The first processing module 1501 is configured to determine a PUCCH resource occupied by transmitting the HARQ-ACK, according to a PRI of the HARQ-ACK in a PDCCH scheduling a PDSCH and an LBT sub-band where a PDCCH resource is located;

The second processing module 1502 is configured to perform the HARQ-ACK transmission on the PUCCH resource occupied by transmitting the HARQ-ACK according to the PUCCH resource occupied by transmitting the HARQ-ACK.

Optionally, the first processing module 1501 is further configured to perform LBT on each PUCCH resource occupied by transmitting the HARQ-ACK indicated by the PRI of the HARQ-ACK in turn, according to the PRI of the HARQ-ACK and the LBT sub-band where the PDCCH resource is located, according to a predefined priority policy.

Optionally, the predefined priority strategy comprises: compared with downlink LBT sub-band where the PDCCH resource including the PRI of the HARQ-ACK is located, the LBT is perform preferentially on the PUCCH resource in an uplink LBT sub-band that is in a same frequency band as the downlink LBT sub-band, wherein the same frequency band is in an unlicensed band.

Optionally, the first processing module 1501 is specifically configured to determine a PUCCH resource subset according to the PRI of the HARQ-ACK in the PDCCH and a downlink LBT sub-band where the PDCCH resource is located, wherein the PUCCH resource subset comprises one or more PUCCH resources occupied by transmitting the HARQ-ACK.

Optionally, the first processing module 1501 is specifically configured to: receive system information, where the system information includes a master information block or a system information block; determine a PUCCH resource set, according to the system information, to indicate one PUCCH resource occupied by transmitting the HARQ-ACK in a PUCCH resource set according to the PRI of the HARQ-ACK in a DCI in the PDCCH scheduling the PDSCH.

The technical solutions provided in the embodiments of the present application have at least the following beneficial effects:
determining a PUCCH resource occupied by transmitting the HARQ-ACK, according to a PRI of the HARQ-ACK in a PDCCH scheduling a PDSCH and an LBT sub-band where a PDCCH resource is located; performing the HARQ-ACK transmission on the PUCCH resource occupied by transmitting the HARQ-ACK according to the PUCCH resource occupied by transmitting the HARQ-ACK. In this way, the present application realizes that in the unlicensed frequency band, the LBT sub-band where the PDCCH is located and the PRI jointly determine the PUCCH resource occupied by transmitting the HARQ-ACK, which can save the number of bits required by the PRI, while ensuring the flexibility of resource indicator.

For the content that is not described in detail in the UE provided in the embodiment of the present application, reference may be made to the foregoing method for transmitting HARQ-ACK. The beneficial effects provided by the UE provided in the embodiment of the present application are the same as the foregoing method for transmitting HARQ-ACK, and will not be repeated here.

Figure 16:
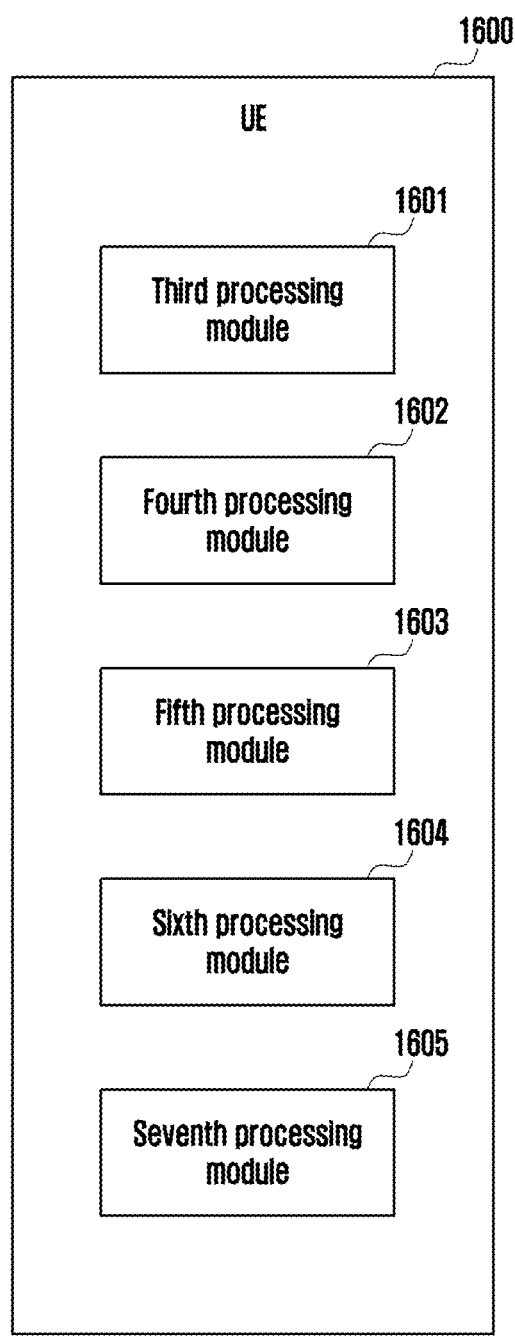
FIG. 16 is a schematic structural diagram of another UE according to an embodiment of the present application.

Based on the same inventive concept of the foregoing embodiment 3, an embodiment of the present application further provides a UE. A schematic structural diagram of the UE is shown in FIG. 16. The UE 1600 includes a third processing module 1601, a fourth processing module 1602, a fifth processing module 1603, a sixth processing module 1604, and a seventh processing module 1605.

The third processing module 1601 is configured to determine an LBT sub-band where a PUSCH resource is located according to the PUSCH resource scheduled by a base station;

The fourth processing module is configured to determine the LBT sub-band where a PUCCH resource is located according to the PUCCH resource indicated by the base station;

The fifth processing module is configured to select at least one resource from the PUCCH resource indicated by the base station and the PUSCH resource scheduled by the base station;

The sixth processing module is configured to perform LBT on the LBT sub-band where the selected resource is located to determine LBT result information;

The seventh processing module is configured to perform the HARQ-ACK transmission on the PUCCH resource or the PUSCH resource according to the LBT result information.

Optionally, the sixth processing module 1604 is specifically configured to perform the LBT on the LBT sub-band where the PUSCH resource is located and the LBT sub-band where the PUCCH resource is located, to obtain the LBT result information.

Optionally, the seventh processing module 1605 is specifically configured to: when the LBT result information is that transmitting the PUSCH is allowed, transmitting the PUSCH on an idle uplink LBT sub-band where the PUSCH resource is located, and performing the HARQ-ACK transmission on the PUSCH resource; when the LBT result information is that transmitting the PUSCH is not allowed and transmitting the PUCCH is allowed, performing the HARQ-ACK transmission on the PUCCH resource of an idle uplink LBT sub-band where the PUCCH resource is located; when the LBT result information is that transmitting the PUSCH is not allowed and transmitting the PUCCH is not allowed, no HARQ-ACK transmission is performed.

Optionally, the seventh processing module 1605 is specifically configured to: when the LBT result information is that transmitting the PUSCH is allowed, transmitting the PUSCH on an idle uplink LBT sub-band where the PUSCH resource is located, and performing the HARQ-ACK transmission on the PUSCH resource; when the LBT result information is that PUSCH cannot be transmitted, no HARQ-ACK transmission is performed.

Optionally, the seventh processing module 1605 is specifically configured to: when the LBT result information is that transmitting the PUCCH is allowed, the PUCCH is transmitted on an idle uplink LBT sub-band where the PUCCH resource is located, and the HARQ-ACK transmission is performed on the PUCCH resource; when the LBT result information is that transmitting the PUCCH is allowed, no HARQ-ACK transmission is performed.

Optionally, the seventh processing module 1605 is specifically configured to: when a serving cell with the smallest cell index number in the scheduled PUSCH is allowed to transmit the PUSCH, according to the LBT result, the PUSCH is transmitted on an idle uplink LBT sub-bands of all serving cells, and the HARQ-ACK transmission is performed on the PUSCH resources of the serving cell with the smallest cell index number; or when the serving cell with the smallest cell index number in the scheduled PUSCH is not allowed to transmit the PUSCH and transmitting the PUCCH is allowed according to the LBT result, the HARQ-ACK transmission is performed on the PUCCH resource of the uplink LBT sub-band whose LBT result is idle, and transmitting the PUSCH is not allowed on the PUSCH resources of other serving cells except the serving cell with the smallest cell index number; or when the serving cell with the smallest cell index number in the scheduled PUSCH is not allowed to transmit the PUSCH and transmitting the PUCCH is allowed according to the LBT result, the HARQ-ACK transmission is performed on the PUCCH resource of the uplink LBT sub-band whose LBT result is idle, and the PUSCH of the other serving cells except the serving cell with the smallest cell index number determines whether to perform the PUSCH transmission according to the LBT result of the other serving cells; the PUSCH of the other serving cells determines whether to perform the PUSCH transmission according to the LBT result of the other serving cell, comprising: when the LBT result is a PUSCH of a serving cell of an idle PUSCH, the PUSCH transmission can be performed on the serving cell of the idle PUSCH; when the LBT result is a PUSCH of a serving cell of a busy PUSCH, the PUSCH transmission cannot be performed on the serving cell of the busy PUSCH.

The technical solutions provided in the embodiments of the present application have at least the following beneficial effects:

In the embodiment of the present application, determining an LBT sub-band where a PUSCH resource is located according to the PUSCH resource scheduled by a base station; determining the LBT sub-band where a PUCCH resource is located according to the PUCCH resource indicated by the base station; selecting at least one resource from the PUCCH resource indicated by the base station and the PUSCH resource scheduled by the base station; performing LBT on the LBT sub-band where the selected resource is located to determine LBT result information; performing the HARQ-ACK transmission on the PUCCH resource or the PUSCH resource according to the LBT result information. In this way, the HARQ-ACK is transmitted in an unlicensed frequency band.

For the content that is not described in detail in the UE provided in the embodiment of the present application, reference may be made to the foregoing method for transmitting HARQ-ACK. The beneficial effects provided by the UE provided in the embodiment of the present application are the same as the foregoing method for transmitting HARQ-ACK, and will not be repeated here.

Figure 17:
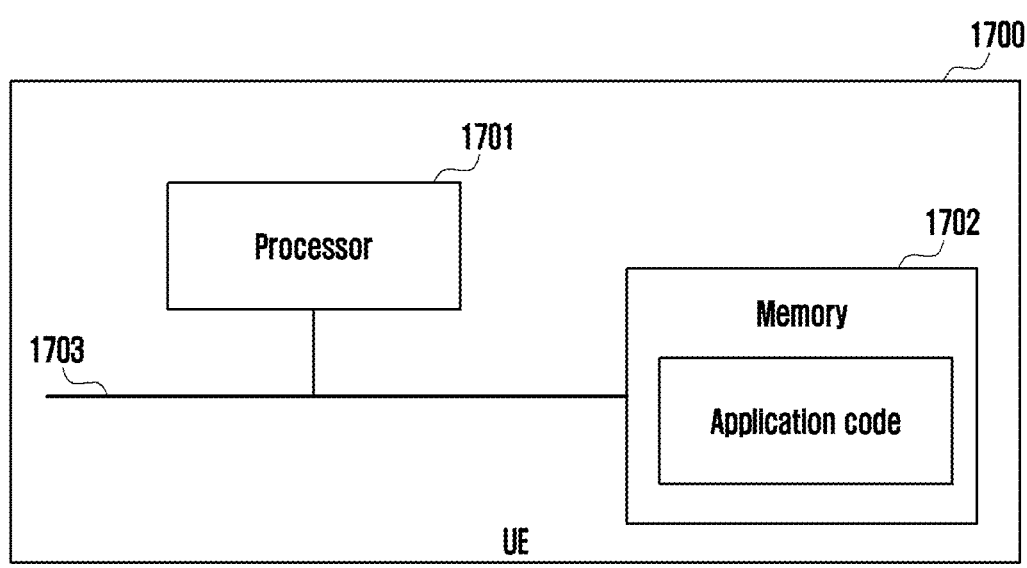
FIG. 17 is a schematic structural diagram of still another UE according to an embodiment of the present application.

Based on the same inventive concept of the embodiment 1, an embodiment of the present application further provides a UE. The structure diagram of the UE is shown in FIG. 17. The UE 1700 includes at least one processor 1701, a memory 1702, and a bus 1703. The at least one processor 1701 is electrically connected to the memory 1702; the memory 1702 is configured to store at least one computer-executable instruction, and the processor 1701 is configured to execute the at least one computer-executable instruction, thereby, the steps of any method for transmitting HARQ-ACK provided by any one of the embodiments or any optional implementation manner of the embodiment 1 in this application are performed.

Further, the processor 1701 may be an Field-Programmable Gate Array (FPGA) or other devices with logic processing capabilities, such as an Microcontroller Unit (MCU), and a Central Process Unit (CPU).

The embodiments of the present application have at least the following beneficial effects:

achieving that in the unlicensed frequency band, the LBT sub-band where the PDCCH is located and the PRI jointly determine the PUCCH resource occupied by transmitting the HARQ-ACK, which can save the number of bits required by the PRI, while ensuring the flexibility of resource indicator.

Figure 18:
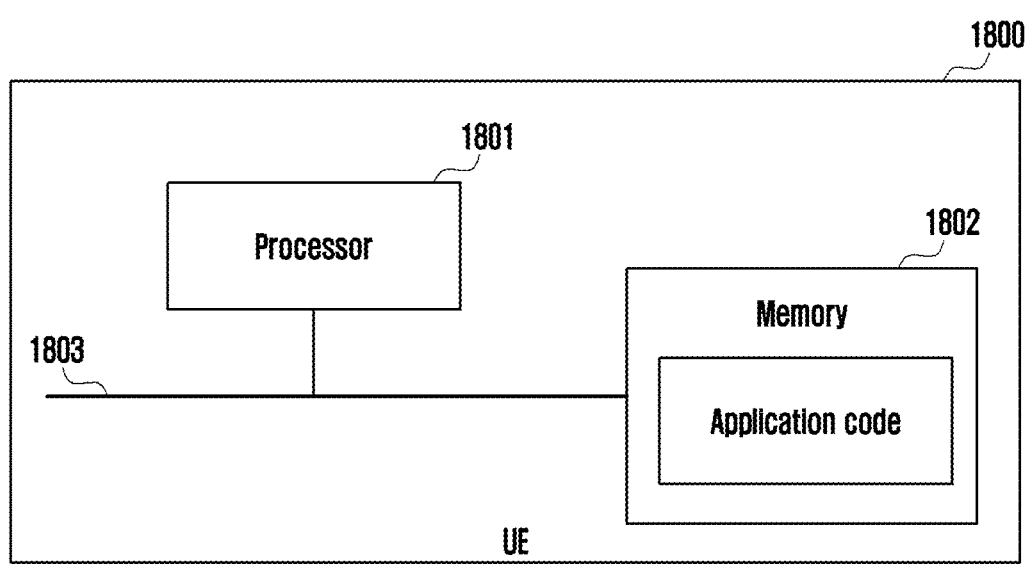
FIG. 18 is a schematic structural diagram of still another UE according to an embodiment of the present application.

Based on the same inventive concept of the embodiment 3, an embodiment of the present application further provides a UE. A schematic structural diagram of the UE is shown in FIG. 18. The UE 1800 includes at least one processor 1801, a memory 1802, and a bus 1803. The at least one processor 1801 is electrically connected to the memory 1802; the memory 1802 is configured to store at least one computer-executable instruction, and the processor 1801 is configured to execute the at least one computer-executable instruction, so that the steps of any method for transmitting HARQ-ACK provided by any one of the embodiments or any optional implementation manner of embodiment 3 in this application are performed.

Further, the processor 1801 may be an FPGA or other devices with logic processing capabilities, such as an MCU, and a CPU.

Based on the same principle as the method provided by the embodiment 2 and embodiment 4 of the disclosure, the embodiment of the disclosure also provides a terminal equipment, which includes a memory and a processor. Wherein a computer program is stored in the memory. The processor is used to execute the method provided in any alternative embodiment of the present disclosure when running the computer program.

Embodiments of the present disclosure also provide a computer-readable storage medium having stored therein a computer program that, when executed by a processor, performs the method provided in any of the alternative embodiments of the present disclosure.

Figure 24:
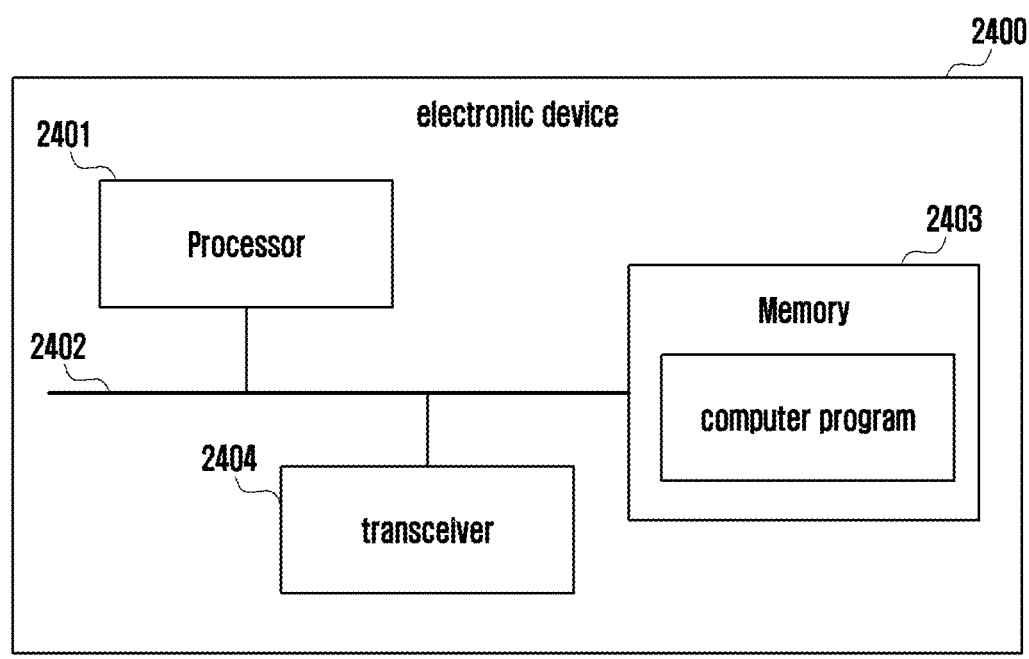
FIG. 24 shows a schematic structural diagram of an electronic device according to an embodiment of the present disclosure.

As an alternative, FIG. 24 shows a schematic structural diagram of an electronic device (specifically, the above terminal equipment or other devices implementing the scheme provided by the embodiment of the present disclosure) provided by the embodiment of the present disclosure. As shown in FIG. 24, the electronic device 2400 may include a processor 2401 and a memory 2403. The processor 2401 and the memory 2403 are connected, for example, via a bus 2402. Alternatively, electronic device 2400 may also include a transceiver 2404. It should be noted that the transceiver 2404 is not limited to one in actual application, and the structure of the electronic device 2400 is not limited to the embodiment of the present disclosure.

The processor 2401 may be a CPU (Central Processing Unit), a general-purpose processor, a DSP (Digital Signal Processor), an ASIC (Application Specific Integrated Circuit), FPGA (Field Programmable Gate Array) or other programmable logic devices, transistor logic devices, hardware components, or any combination thereof. Which may implement or execute the various illustrative logical blocks, modules, and circuits described in connection with the present disclosure. The processor 2401 may also be a combination that implements computing functions, such as a combination that includes one or more microprocessors, a combination of DSP and microprocessors, etc.

Bus 2402 may include a path to transfer information between the above components. The bus 2402 may be a PCI (Peripheral Component Interconnect) bus or an EISA (Extended Industry Standard Architecture) bus or the like. Bus 2402 can be divided into an address bus, a data bus, a control bus, etc. For ease of representation, only one thick line is used in FIG. 24, but it does not mean only one bus or one type of bus.

Memory 2403 may be a ROM (Read Only Memory) or other type of static storage device that can store static information and instructions, a RAM (Random Access Memory) or other type of dynamic storage device that can store information and instructions. It can also be an EEPROM (Electrically Erasable Programmable Read Only Memory), a CD-ROM (Compact Disc Read Only Memory), a Read-only optical disc) or other optical disc storage, optical disc storage (including compact disc, laser disc, optical disc, digital versatile disc, Blu-ray disc, etc.), magnetic disc storage medium or other magnetic storage device, or any other medium capable of carrying or storing desired program code in the form of instructions or data structures and capable of being accessed by a computer, but is not limited thereto.

The memory 2403 is configured to store application program codes for executing the scheme of the present disclosure, and the execution is controlled by the processor 2401. The processor 2401 is configured to execute the disclosure program codes stored in the memory 2403 to implement the contents shown in any of the foregoing method embodiments.

The embodiments of the present application have at least the following beneficial effects: Achieve HARQ-ACK transmission in unlicensed frequency band.

The technical scheme provided by the disclosure has additional beneficial effects that: the LBT execution method, device, terminal equipment and computer-readable storage medium provided by the embodiment of the disclosure solve the problem of how to realize SRS transmission in an unauthorized frequency band. Based on the solution, frequency domain resources for transmitting SRS before SRS transmission in an unauthorized frequency band can be determined, that is, in order to transmit the uplink LBT sub-band of SRS, LBT can be further performed on the determined frequency domain resources to perform SRS transmission based on the determined LBT result of the uplink LBT sub-band.

It should be appreciated by the person skilled in the art that each block as well as the combination of the blocks in the structural block graphs and/or block graphs and/or flowcharts may be implemented through computer program instructions. It should be appreciated by the person skilled in the art that these computer program instructions may be provided to general-purpose computer, dedicated computer or other processors capable of programming the data processing methods, to generate machines, so as to implement the methods specified in the block(s) of the structural block graphs and/or block graphs and/or flowcharts through the instructions executed on the computer or other processors capable of programming the data processing methods.

It should be appreciated by the person skilled in the art that the various operations, methods, steps in the flow, measures and schemes discussed in the present application can be alternated, modified, combined or deleted. Furthermore, other operations, methods, steps in the flow, measures and schemes involving the various operations, methods, steps in the flow, measures and schemes discussed in the present application may also be alternated, modified, rearranged, dissolved, combined or deleted. Furthermore, other operations, methods, steps in the flow, measures and schemes having the same functions with the various operations, methods, steps in the flow, measures and schemes discussed in the present application may also be alternated, modified, rearranged, dissolved, combined or deleted.

The above description is only part of the embodiments of the present application. It should be noted that, for those of ordinary skill in the art, without departing from the principles of the present application, several improvements and retouches can be made. These improvements and retouches also should be regarded as the protection scope of the present application.

The invention claimed is:

1. A method performed by a user equipment (UE) in a communication system, the method comprising:
receiving, from a base station via a higher layer signaling, information for physical uplink control channel (PUCCH) resources constituting a PUCCH resource set and information for subsets of the PUCCH resource set, wherein multiple PUCCH resources in a subset of the PUCCH resource set belong to different uplink listen before talk (LBT) sub-bands;
receiving, from the base station, a physical downlink control channel (PDCCH) scheduling a physical downlink shared channel (PDSCH), wherein the PDCCH provides downlink control information (DCI) including a PUCCH resource indicator (PRI) indicating the subset of PUCCH resource set from the subsets of the PUCCH resource set;
performing LBT on uplink LBT sub-bands in turn according to a priority order, wherein the uplink LBT sub-bands are where PUCCH resources in the subset of PUCCH resource set are located;
identifying a PUCCH resource to transmit hybrid automatic repeat request acknowledgement (HARQ-ACK) information for the PDSCH based on the LBT performed on the uplink LBT sub-bands; and
transmitting, to the base station, the HARQ-ACK information on the PUCCH resource,
wherein mapping between the PRI and the subsets of PUCCH resource set is independent of downlink LBT sub-band where the PDCCH is received, and
wherein a first uplink LBT sub-band which is in a same frequency band as a downlink LBT sub-band where the PDCCH is located has priority over a second uplink LBT sub-band which is in a different frequency band from the downlink LBT sub-band where the PDCCH is located.

2. The method of claim 1, wherein the subset of PUCCH resource set is indicated based on a PRI field included in the PDCCH scheduling the PDSCH.

3. The method of claim 2, wherein a bit size of the PRI field is 3 bits.

4. The method of claim 1, wherein the uplink LBT sub-bands belong to one uplink bandwidth part (BWP).

5. A method performed by a base station in a communication system, the method comprising:
transmitting, to a user equipment (UE) via a higher layer signaling, information for physical uplink control channel (PUCCH) resources constituting a PUCCH resource set and information for subsets of the PUCCH resource set, wherein multiple PUCCH resources in a subset of the PUCCH resource set belong to different uplink listen before talk (LBT) sub-bands;
transmitting, to the UE, a physical downlink control channel (PDCCH) scheduling a physical downlink shared channel (PDSCH), wherein the PDCCH provides downlink control information (DCI) including a PUCCH resource indicator (PRI) indicating the subset of PUCCH resource set from the subsets of the PUCCH resource set; and
receiving, from the UE, a hybrid automatic repeat request acknowledgement (HARQ-ACK) information for the PDSCH on a PUCCH resource, wherein the PUCCH resource is identified based on LBT performed on uplink LBT sub-bands in turn according to a priority order, and the uplink LBT sub-bands are where PUCCH resource in the subset of PUCCH resource set are located,
wherein mapping between the PRI and the subsets of PUCCH resource set is independent of downlink LBT sub-band where the PDCCH is received, and
wherein a first uplink LBT sub-band which is in a same frequency band as a downlink LBT sub-band where the PDCCH is located has priority over a second uplink LBT sub-band which is in a different frequency band from the downlink LBT sub-band where the PDCCH is located.

6. The method of claim 5, wherein the subset of PUCCH resource set is indicated based on a PRI field included in the PDCCH scheduling the PDSCH.

7. The method of claim 6, wherein a bit size of the PRI field is 3 bits.

8. The method of claim 5, wherein the uplink LBT sub-bands belong to one uplink bandwidth part (BWP).

9. A user equipment (UE) in a communication system, the UE comprising:
a transceiver; and
a controller configured to:
receive, from a base station via a higher layer signaling, information for physical uplink control channel (PUCCH) resources constituting a PUCCH resource set and information for subsets of the PUCCH resource set, wherein multiple PUCCH resources in a subset of the PUCCH resource set belong to different uplink listen before talk (LBT) sub-bands,
receive, from the base station, a physical downlink control channel (PDCCH) scheduling a physical downlink shared channel (PDSCH), wherein the PDCCH provides downlink control information (DCI) including a PUCCH resource indicator (PRI), indicating the subset of PUCCH resource set from the subsets of the PUCCH resource set,
perform LBT on uplink LBT sub-bands in turn according to a priority order, wherein the uplink LBT sub-band are where PUCCH resources in the subset of PUCCH resource set are located,
identify a PUCCH resource to transmit hybrid automatic repeat request acknowledgement (HARQ-ACK) information for the PDSCH based on the LBT performed on the uplink LBT sub-bands, and
transmit, to the base station, the HARQ-ACK information on the PUCCH resource,
wherein mapping between the PRI and the subsets of PUCCH resource set is independent of downlink LBT sub-band where the PDCCH is received, and
wherein a first uplink LBT sub-band which is in a same frequency band as a downlink LBT sub-band where the PDCCH is located has priority over a second uplink LBT sub-band which is in a different frequency band from the downlink LBT sub-band where the PDCCH is located.

10. The UE of claim 9, wherein the subset of PUCCH resource set is indicated based on a PRI field included in the PDCCH scheduling the PDSCH.

11. The UE of claim 10, wherein a bit size of the PRI field is 3 bits.

12. The UE of claim 9, wherein the uplink LBT sub-bands belong to one uplink bandwidth part (BWP).

13. A base station in a communication system, the base station comprising:
 a transceiver; and
 a controller configured to:
  transmit, to a user equipment (UE) via a higher layer signaling, information for physical uplink control channel (PUCCH) resources constituting a PUCCH resource set and information for subsets of the PUCCH resource set, wherein multiple PUCCH resources in a subset of the PUCCH resource set belong to different uplink listen before talk (LBT) sub-bands,
  transmit, to the UE, a physical downlink control channel (PDCCH) scheduling a physical downlink shared channel (PDSCH), wherein the PDCCH provides downlink control information (DCI) including a PUCCH resource indicator (PRI) indicating the subset of PUCCH resource set from the subsets of the PUCCH resource set, and
  receive, from the UE, a hybrid automatic repeat request acknowledgement (HARQ-ACK) information for the PDSCH on a PUCCH resource, wherein the PUCCH resource is identified based on LBT performed on uplink LBT sub-bands in turn according to a priority order, and the uplink LBT sub-bands are where PUCCH resource in the subset of PUCCH resource set are located,
 wherein mapping between the PRI and the subsets of PUCCH resource set is independent of downlink LBT sub-band where the PDCCH is received, and
 wherein a first uplink LBT sub-band which is in a same frequency band as a downlink LBT sub-band where the PDCCH is located has priority over a second uplink LBT sub-band which is in a different frequency band from the downlink LBT sub-band where the PDCCH is located.

14. The base station of claim 13, wherein the subset of PUCCH resource set is indicated based on a PRI field included in the PDCCH scheduling the PDSCH.

15. The base station of claim 14, wherein a bit size of the PRI field is 3 bits.

* * * * *